US008031169B2

(12) United States Patent
Hoerl

(10) Patent No.: US 8,031,169 B2
(45) Date of Patent: Oct. 4, 2011

(54) AUTOMATED SYSTEM AND METHOD FOR HIGH-FREQUENCY SIGNAL ATTENUATION COMPENSATION

(75) Inventor: David Hoerl, Warren, NJ (US)

(73) Assignee: RIIP, Inc., Wilmington, DE (US)

( * ) Notice: Subject to any disclaimer, the term of this patent is extended or adjusted under 35 U.S.C. 154(b) by 1163 days.

(21) Appl. No.: 10/740,381

(22) Filed: Dec. 17, 2003

(65) Prior Publication Data
US 2005/0134748 A1    Jun. 23, 2005

(51) Int. Cl.
  *G09G 5/00* (2006.01)
  *G06F 3/038* (2006.01)
  *G06F 3/00* (2006.01)
  *G09G 1/06* (2006.01)
  *H04N 7/173* (2006.01)
  *H04N 7/16* (2006.01)

(52) U.S. Cl. .......... 345/156; 345/204; 345/10; 725/133; 725/141; 725/153; 710/15

(58) Field of Classification Search .............. 725/127, 725/133, 141, 153; 345/156, 157, 163, 168, 345/204, 210, 214, 1.1, 3.4, 30, 10; 710/15
See application file for complete search history.

(56) References Cited

U.S. PATENT DOCUMENTS

| | | | | |
|---|---|---|---|---|
| 3,845,240 | A | | 10/1974 | Alaily |
| 4,007,423 | A | * | 2/1977 | Dickinson ................. 324/76.27 |
| 4,054,910 | A | * | 10/1977 | Chou et al. .................... 725/78 |
| 4,151,490 | A | * | 4/1979 | Bazin ............................ 333/16 |
| 4,352,094 | A | * | 9/1982 | Reneric ......................... 341/118 |
| 4,392,159 | A | * | 7/1983 | Lemoine et al. .............. 386/12 |
| 4,742,543 | A | | 5/1988 | Frederiksen |
| 5,083,198 | A | * | 1/1992 | Haferl et al. ................. 348/675 |
| 5,193,200 | A | | 3/1993 | Asprey et al. |
| 5,257,390 | A | * | 10/1993 | Asprey ........................ 710/300 |
| 5,268,676 | A | * | 12/1993 | Asprey et al. ................ 345/169 |
| 5,276,404 | A | | 1/1994 | Asprey et al. |
| 5,283,789 | A | | 2/1994 | Gunnarsson et al. |
| 5,285,197 | A | | 2/1994 | Schmidt et al. |
| 5,353,409 | A | * | 10/1994 | Asprey et al. ................ 375/296 |
| 5,386,590 | A | * | 1/1995 | Dolan ........................... 455/557 |
| 5,721,842 | A | | 2/1998 | Beasley et al. |
| 5,732,212 | A | * | 3/1998 | Perholtz et al. .............. 709/224 |
| 5,884,096 | A | | 3/1999 | Beasley et al. |

(Continued)

FOREIGN PATENT DOCUMENTS
CN    1296397    *    2/1992

OTHER PUBLICATIONS
Adder, Products Brochure, APX 304572-304579, Apr. 1, 1998, 8 pages.

(Continued)

*Primary Examiner* — Hoang-Vu A Nguyen-Ba

(57) ABSTRACT

Disclosed is a high-frequency boost circuitry for use with a computer management system. Detection circuitry at the receiving end of a video signal measures the amplitudes of various frequency components of the video signal. If the amplitudes of the high-frequency components of the video signal are substantially lower than the amplitudes of the low frequency components of the video signal, the detection circuitry sends the amplitude information to analysis circuitry located at the transmitting end of the video signal. The analysis circuitry utilizes this information to determine the appropriate level of amplification needed for the video signal. This results in improved signal to noise ratio at the receiver in the computer management system.

50 Claims, 13 Drawing Sheets

U.S. PATENT DOCUMENTS

| | | | |
|---|---|---|---|
| 5,937,176 A | 8/1999 | Beasley et al. | |
| 5,978,389 A * | 11/1999 | Chen | 370/538 |
| 6,112,264 A | 8/2000 | Beasley et al. | |
| 6,119,148 A * | 9/2000 | Chen | 709/204 |
| 6,138,191 A * | 10/2000 | Fujii et al. | 710/73 |
| 6,150,997 A | 11/2000 | Asprey | |
| 6,184,919 B1 | 2/2001 | Asprey et al. | |
| 6,265,951 B1 | 7/2001 | Kirshtein | |
| 6,333,750 B1 * | 12/2001 | Odryna et al. | 345/629 |
| 6,345,323 B1 * | 2/2002 | Beasley et al. | 710/38 |
| 6,539,418 B2 * | 3/2003 | Schneider et al. | 709/203 |
| 6,557,170 B1 * | 4/2003 | Wilder et al. | 725/130 |
| 6,771,213 B2 | 8/2004 | Durst et al. | |
| 6,790,094 B1 * | 9/2004 | Bergmann et al. | 439/653 |
| 6,795,580 B1 * | 9/2004 | Janko et al. | 382/199 |
| 7,113,978 B2 | 9/2006 | Beasley et al. | |
| 2003/0074674 A1 * | 4/2003 | Magliaro | 725/118 |

OTHER PUBLICATIONS

AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (No. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No.: 01-CV-4435, May 5, 2005.
Compaq, White papers, 1996, APX 083313-APX 083326, APX 083335-APX 083389.
Ching-I Hsu Deposition Transcript, Case No.: 01-Cv-4435, Mar. 11, 2005.
Cybex, Director Installer/User Guide, Nov. 1996.
Cybex, 4 x P & 1 x P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer Inc.'s Response to Plaintiffs First Set of Post Remand Interrogatory Requirements to Raritan (No. 1R-16R). (Dec. 16, 2004).
Defendant Raritan Computer, Inc.'s Response to Plaintiffs Second Set of Interrogatories (No. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (No. 9-12), Aug. 31, 2001.
Defendant Raritan Computer, Inc.'s Supplemental Response to Plaintiffs Second Set of Interrogatories (No. 9-12), Dec. 12, 2001.
DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, filed Jun. 14, 2004.
Findings and Conclusions, Apex v. Raritan, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No.: 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, Avocent v. Raritan, Civil Action No. 4435, Feb. 3, 2005.
Marksman Transcript, Avocent v. Raritan, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, filed Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KXS, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.

Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView Se 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-Cv-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
Trial Transcript, *Apex* v. *Raritan*, Southern District of New York, Case No. 01-CV-4435, vol. 7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, PW2 Advantage Series Rackmount Server, 1995.
Yee Liaw Deposition Transcript, Case No. 01-CV-4435, Mar. 3, 2005.
Yee-Shung Liaw Deposition Transcript, Case No. 01-CV-4435, Dec. 6, 2001.
The list of docket report in the litigation: *Avocent Redmond Corp.* v. *Raritan Computer, Inc.*, Civil Action No. 1:01-CV-04435(PKC), United States District Court for the Southern District of New York.

* cited by examiner

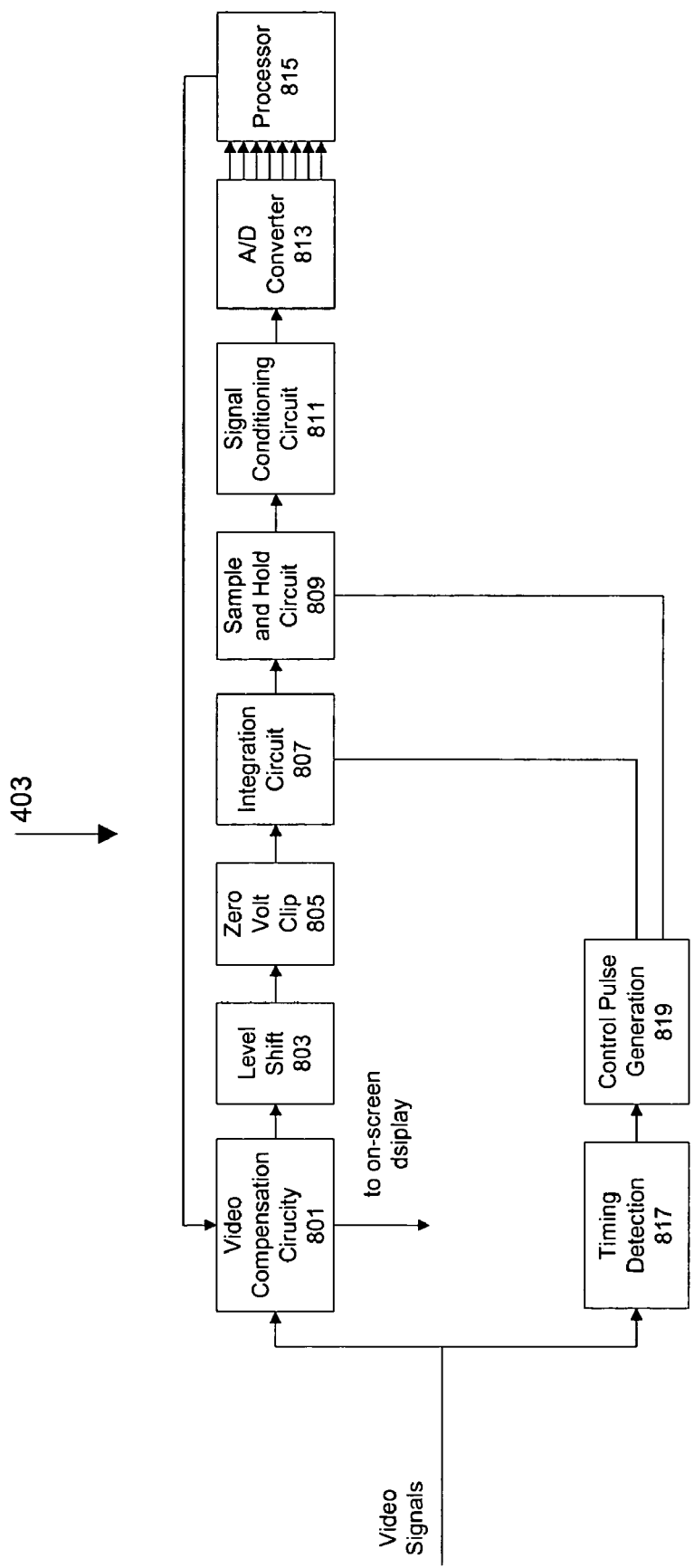

AUTOMATED SYSTEM AND METHOD FOR HIGH-FREQUENCY SIGNAL ATTENUATION COMPENSATION

FIELD OF THE INVENTION

The present invention relates generally to an automated system and method for performing a high-frequency boost to a video signal transmitted over great distances. More specifically, the present invention relates to the analysis of transmitted video signals and the application of a high-frequency boost in response to this analysis.

BACKGROUND OF THE INVENTION

In a typical computer environment, a Local Area Network (LAN) allows for one or more computer servers to be connected to several computers such that the resources of each server are available to each of the connected computers. In this system, a dedicated keyboard, video monitor, and cursor control device may be employed for each computer and computer server.

To maintain proper operation of the LAN, a system administrator must maintain and monitor the individual servers and computers. This maintenance frequently requires the system administrator to perform numerous tasks from the user console located at the server or computer. For example, to reboot a computer or to add or delete files, the system administrator is often required to operate the server or computer from its local user console, which may be located at a substantial distance from the system administrator's computer. Therefore, to accomplish the task of system administration, the system administrator must often travel far distances to access the local user consoles of remotely located servers and computers.

As an alternative, dedicated cables may be installed from each remotely located server and computer to the system administrator's user console to allow the system administrator to fully access and operate the remote computer equipment. However, this alternative requires substantial wiring and wire harnessing, both of which may require tremendous cost. Additionally, as the distance between the system administrator's user console and the remote computer equipment increases, a decrease in the quality of the transmitted signal often results. Thus, dedicated cables between the system administrator's user console and remote computer equipment may not be a feasible alternative.

In addition to system administration, space is also an important concern for many networked computer environments, especially large-scale operations such as data-centers, server-farms, web-hosting facilities, and call-centers. These environments typically require space to house a keyboard, video monitor, and cursor control device for each piece of computer equipment in addition to all of the wiring required to connect and power these components. Furthermore, space is also required to house all of the network wiring. As more equipment is added to a computer network, it becomes more probable that the space required for the equipment and associated cabling will exceed the space allotted for the network. Therefore, network architecture, equipment size, and available space are important issues when designing an effective computer network environment.

One method of reducing the space required to house a computer network is to eliminate non-essential equipment (i.e., keyboard, video monitor, cursor control device, etc.). Elimination of this equipment also eliminates the wiring associated with such equipment. This equipment and its associated wiring may be eliminated if a system administrator is able to access the remote computers from one user console.

However, when the video monitor is located at a great distance from the video source, the video signal may become greatly attenuated. This attenuation is generally frequency dependent, with the greatest amount of frequency attenuation occurring in the high frequencies. To solve this problem, high-frequency boost circuitry is placed at a location near the video source and selectively switched in or out of the video source either automatically or manually. However, the high-frequency boost circuitry is typically set (i.e., to be in or out of the video source) and tends to remain fixed once set.

A keyboard, video monitor, and mouse ("KVM") switching system may be utilized to allow one or more user workstations to select and control any one of a plurality of remote computers via a central switching unit. Such systems are well known in the art and have been used by system administrators for at least 10 years. Specifically, a KVM switching system allows a system user to control a remote computer using a local user workstation's keyboard, video monitor, and cursor control device as if these local devices are directly connected to the remote computer. In this manner, a system user may access and control a plurality of remote computers, such as servers, from a single location (i.e., the location of the user workstation). The system user may select a specific remote computer to access or control using any one of a variety of methods known in the art including pushing a button that corresponds with the desired remote computer and is located on the face of a computer management system component, selecting the computer from a list displayed on a computer management system component's LCD or LED display, pressing one or more hot keys on the local user workstation's keyboard (e.g., F1, ALT-F1, F2, etc.), selecting the remote computer from a list displayed on the user workstation's monitor by pointing to it or scrolling to it using the user workstation's keyboard and/or cursor control device, etc.

A need clearly exists for an automated high-frequency boost system and method capable of automatically correcting for high-frequency attenuation which occurs to a video signal during transmission over long lengths of cabling. Furthermore, such a system may be able to determine the amount of degradation experienced by a video signal during video transmission to intelligently enable high-frequency boost circuitry located at the transmitting end of the video signal to compensate for the high-frequency degradation of the video signal. Such a system would aid in computing environments such as server farms, call centers, computer networking facilities, etc.

SUMMARY OF THE INVENTION

It is often convenient to control one or more connected computers from one local set of peripheral devices (i.e., keyboard, video monitor, cursor control device, etc.). Since the majority of computers in use today incorporate or are designed to be compatible with commonly known and used computer technologies (e.g., IBM, Apple, Sun, etc.), many computers use identical or similar electrical connectors to connect a peripheral device. Also, a computer typically contains a dedicated electrical connector for each type of peripheral device to which the computer will be connected. Generally, the cables that connect such peripheral devices to the respective electrical connector are approximately six feet in length, thereby limiting the distance from the computer at which the peripheral devices may be located.

In many circumstances, it may be desirable to separate the peripheral devices from the computer due to space constraints. However, one skilled in the art may readily appreciate that separating a computer from its peripheral devices may make it difficult to locate the remote computers because they are commonly located in another area of the building, such as in a data center, server-farm, etc. Unless each device is clearly labeled, there exists no means of differentiating computers without their attached peripheral devices.

In addition to extending the distance between a computer and its peripheral devices, it is also convenient to access and operate more than one computer from one set of peripheral devices. Again, this feature is desirable when space is limited.

However, as previously discussed, signal degradation often occurs when video signals are transmitted over a great distance through cabling. To compensate for this signal degradation, the present invention incorporates automated high-frequency boost circuitry which automatically compensates for high-frequency signal degradation. Detection circuitry at the receiving end of the video signal measures the amplitudes of various frequency components of the video signal. If the amplitudes of the high-frequency components of the video signal are substantially lower than the amplitudes of the low frequency components of the video signal, the detection circuitry sends the amplitude information to analysis circuitry located at the transmitting end of the video signal. The analysis circuitry determines the high-frequency boost needed to compensate for the signal degradation and applies this boost to video signals before the signals are transmitted. Alternatively, the analysis circuitry may simply receive a control signal from the detection circuitry instructing the transmitter to switch the high-frequency boost circuitry in or out, depending on whether the high-frequency components of the received signals are significantly attenuated. This results in an improved signal to noise ratio at the receiver and eliminates the problem of high-frequency signal attenuation. The high-frequency boost circuitry may also be manually controlled by a user if desired.

In an alternate embodiment of the present invention, synchronization signals transmitted with the video signal can be utilized to determine what high-frequency boost is necessary. As is known in the art, included with the standard red, green and blue components of video signals are horizontal and vertical synchronization signals to instruct a video monitor when the end of a line or frame of video has been reached. Generally, a synchronization signal is a square pulse, which, as is known to one skilled in the art, is composed of both low-frequency and high-frequency components. Therefore, by analyzing a received synchronization signal, it can be determined if certain components (i.e., certain frequencies) of the signal are being attenuated (or conversely, over amplified). In the present invention, the synchronization signals are sent on the same lines as the other video signal components (i.e., the green, and blue components). Therefore, in this alternate embodiment of the present invention, the analysis circuitry analyzes the synchronization signals (preferably the horizontal synchronization signal which occurs more frequently) to determine the level of amplification needed to correctly compensate for high-frequency attenuation. Specifically, a feed-back loop can be established in which the analysis circuitry determines if the signal is being over-compensated, providing control signals accordingly.

The computer management system of the present invention may be utilized to provide compatibility between various operating systems and/or communication protocols. The present invention allows the same set of local peripheral devices to access connected computers executing a variety of operating systems and protocols, including but not limited to, those manufactured by Microsoft Corporation ("Microsoft") (Windows), Apple Computer, Inc. ("Apple") (Macintosh), Sun Microsystems, Inc. ("Sun") (Solaris), Digital Equipment Corporation ("DEC"), Compaq Computer Corporation ("Compaq") (Alpha), International Business Machines ("IBM") (RS/6000), Hewlett-Packard Company ("HP") (HP9000), and SGI (formerly "Silicon Graphics, Inc.") ("IRIX").

Additionally, local devices such as a keyboard and cursor control device may communicate with the local user workstation using a variety of protocols including, but not limited to Universal Serial Bus ("USB"), American Standard Code for Information Interchange ("ASCII"), and Recommend Standard-232 ("RS-232").

A variety of cabling mechanisms may be used to connect the local user workstations and the connected computers to the computer management system of the present invention. Preferably, the present invention incorporates a single Category 5 Universal Twisted Pair ("CAT 5") cable to connect each user terminal ("UST") (i.e., the computer management system component that connects the keyboard, video monitor, and cursor control device of the local user workstation to the computer management system of the present invention) and each computer interface module ("CIM") (i.e., the computer management system component that connects the connected computer to the computer management system of the present invention) to the matrix switching unit ("MSU") of the computer management system of the present invention. However, other cabling or wireless communications may be used without departing from the spirit of the present invention.

Therefore, it is an object of the present invention to provide an automated system to correctly compensate for the high-frequency attenuation of a transmitted video signal.

It is a further object of the present invention to provide a system capable of measuring the strength of the high-frequency components of a video signal at a receiving end and amplify the high-frequency components of the video signal utilizing high-frequency boost circuitry.

It is another object of the present invention to provide a system that analyzes synchronization signals to determine if a system is correctly compensating for high-frequency attenuation.

Additionally, it is an object of the present invention to provide a system for manually tuning the high-frequency boost applied to a video signal to produce an improved video signal.

It is yet another object of the present invention to provide such frequency compensation in an improved, modular, computer management system that is reliable and minimizes the quantity of expensive and space-consuming peripheral devices required to access and operate multiple remote computers.

Furthermore, it is an object of the present invention to provide a computer management system that allows high resolution video to be displayed at an extended distance from the computer at which the video signals originate.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 4B is a block diagram of an alternate embodiment of the frequency attenuation detection circuitry depicted in FIG. 4A, in which the synchronization signals are analyzed to determine the necessary signal boost to compensate for the high-frequency attenuation.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
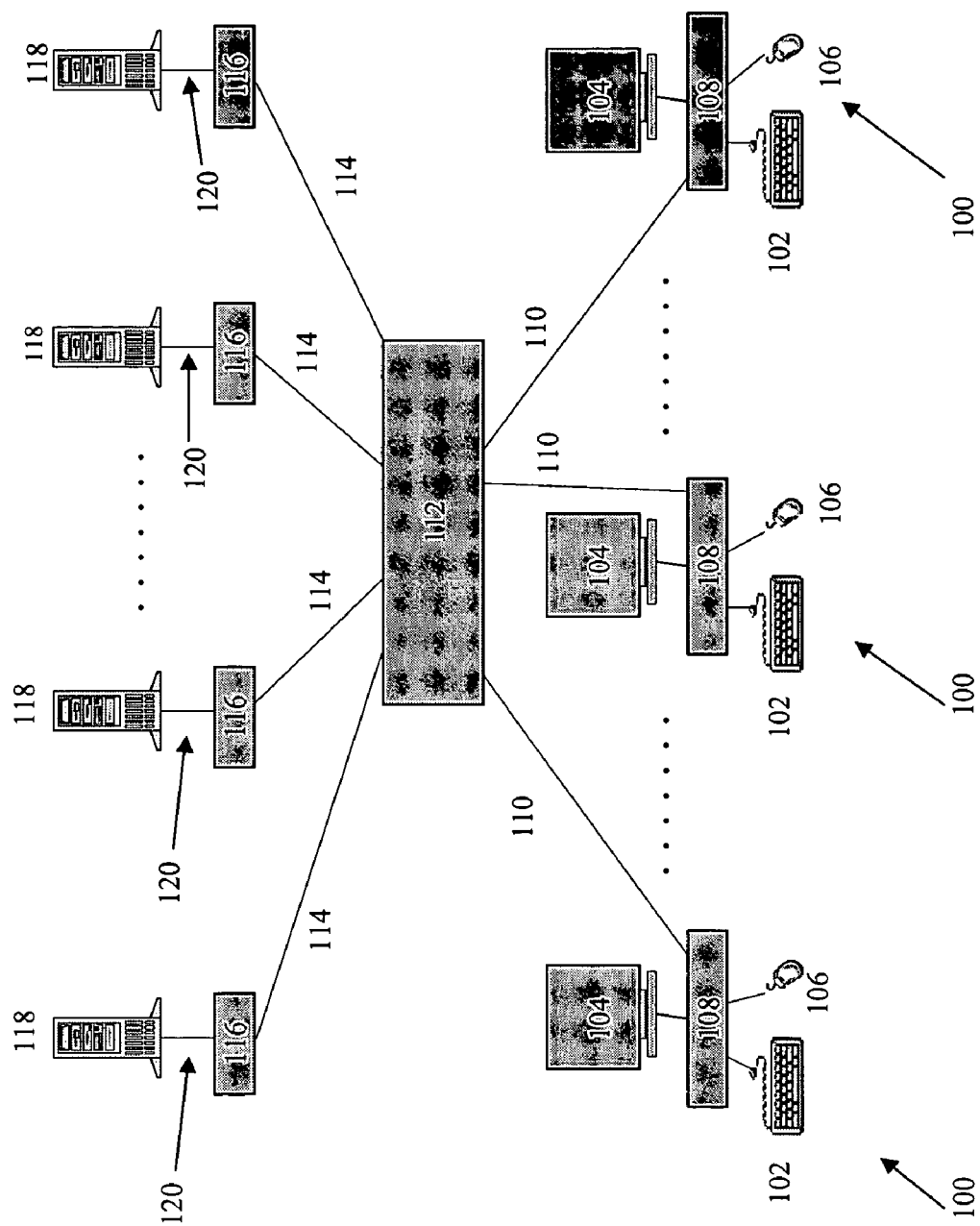
FIG. 1 depicts a KVM remote management system according to the preferred embodiment of the present invention illustrating the connection of a plurality of workstations that include keyboard, video monitor, and cursor control device to multiple remote computers, wherein the system includes a plurality of user station devices ("USTs") and computer interface modules ("CIMs") interconnected by at least one matrix switching unit ("MSU").

Referring first to FIG. 1, depicted is the architecture of the preferred computer management system in accordance with the present invention. Specifically, a modular, intelligent, computer management system is shown including a centrally located matrix switching unit (MSU) 112, multiple user stations (USTs) 108, having attached keyboards 102, video monitors 104, and cursor control devices 106, and multiple computer interface modules (CIMs) 116 each connected to a remote computer 118. Each UST 108 and each CIM 116 is preferably connected to MSU 112 via cables 110 and 114, respectively, which are preferably Category 5 Universal Twisted Pair (CAT 5) cables.

Although single CAT 5 cabling is the preferred cabling for use with the present invention, other cabling may be used, such as coaxial, fiber optic or multiple CAT 5 cables, depending on the specific needs of the system user. CAT 5 cabling is preferred because it reduces cabling cost while maintaining the strength of signals that are transmitted over extended distances. Additionally, the use of single CAT 5 cabling minimizes the space required to house the computer system and its associated wiring. Alternatively, the cables described for use with the invention may be replaced with a form of wireless communications.

Individual CAT 5 cables may be used for connection of each UST 108 and each CIM 116 to MSU 112. Conventional CAT cables include four (4) twisted pair of wires. The present invention utilizes three (3) of these twisted pair for the transmission of video signals. Each of the three (3) twisted pair transmits one of the three video color signals (i.e., red, green or blue). To allow all video signals to be transmitted via only (3) twisted pair, the horizontal and vertical synchronization signals, which would otherwise require their own twisted pairs, are individually encoded on one of the three color video signals. That is, each synchronization signal is encoded on its own, dedicated color signal. For example, the vertical synchronization signal may be encoded on the blue video signal while the horizontal synchronization signal may be encoded on the green video signal. All other non-video signals such as keyboard, cursor control device, and audio signals, are transmitted via the fourth twisted pair cable.

Cables 110 and 114 are connected to UST 108, MSU 112 and CIM 116 by plugging each end into a RJ-45 connector located on the respective components to be coupled by cables 110 and 114. Although RJ-45 connectors are preferred, other types of connectors may be used, including but not limited to RJ-11, RG-58, RG-59, British Naval Connector ("BNC"), and ST connectors.

The remote computer management system includes local user workstations 100, each preferably comprising dedicated peripheral devices such as keyboard 102, video monitor 104 and/or cursor control device 106. Other peripheral devices may also be located at workstation 100, such as printers, scanners, video camera, biometric scanning devices, microphones, etc. Each peripheral device is directly or indirectly connected to UST 108, which is attached to MSU 112 via cable 110. Of course, wireless peripheral devices may also be used with this system. During operation, all electronic signals received at UST 108 from attached peripheral devices are transmitted to MSU 112 via cable 110. Thereafter, the signals are transmitted to the desired CIM 116 via another cable 114. CIM 116, being coupled to remote computer 118, transmits the received signals to the respective ports of remote computer 118.

Preferably, CIM 116 contains high-frequency boost circuitry for amplifying the high-frequency components of the video signal to compensate for video signal degradation which occurs when video signals are transmitted over extended lengths of wires. The high-frequency boost circuitry located within CIM 116 preferably amplifies the high-frequency components of the video signal since these are the components which generally suffer the most attenuation.

Figure 3:
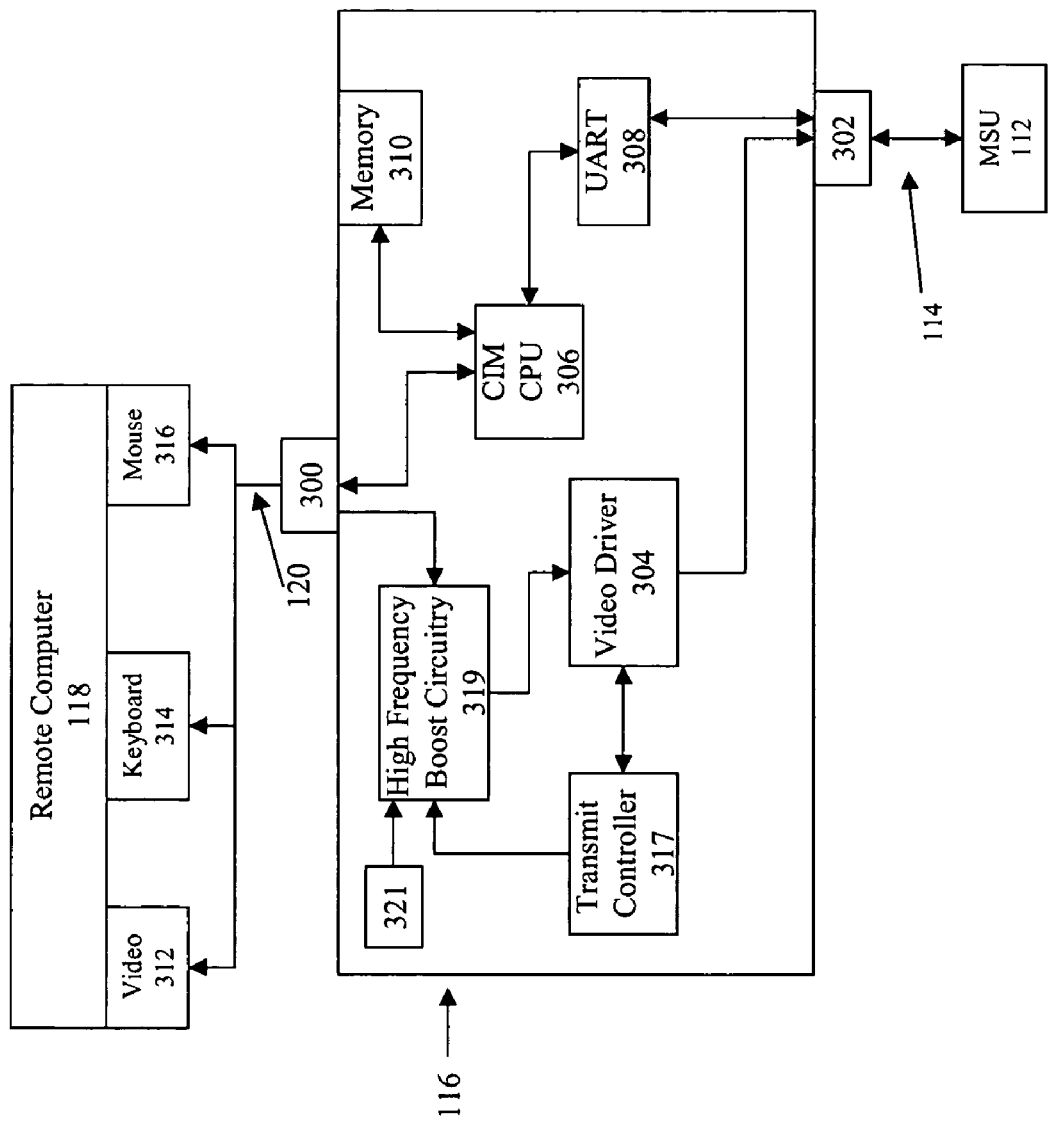
FIG. 3 is a block diagram of the CIM shown in FIG. 1 illustrating the high-frequency boost circuitry utilized to boost the amplitude of the high-frequency components of the video signal, the connection to a remote computer, and the port for connecting a CAT 5 cable leading to the MSU.

Preferably, to control the amount of signal amplification applied, a feedback loop is utilized. Signal level detector 403, located within UST 108 (FIG. 4A), analyzes the amplitudes of different frequencies within the received video signal and transmits this information to transmit controller 317 located in CIM 116 (FIG. 3). Preferably, signal level detector 403 sends this information to transmit controller 317 via the same communications pathway utilized for the keyboard and/or cursor control device signals. Transmit controller 317 utilizes this information to determine the signal-to-noise ratio of the video signal. If the signal-to-noise ratio is too low (e.g., below a predetermined threshold), or if the high-frequency components of the video signal have been significantly attenuated, transmit controller 317 determines the high-frequency signal amplification needed in order to produce a video signal with an acceptable signal-to-noise ratio. Transmit controller 317 then directs the high-frequency boost circuitry 319 to amplify the video signal by the appropriate amount, if at all.

Preferably, CIM 116 is compatible with all commonly used computer operating systems and protocols, including but not limited to those manufactured by Microsoft (Windows), Apple (Macintosh), Sun (Solaris), DEC, Compaq (Alpha), IBM (RS/6000), HP (HP9000) and SGI (IRIX). Additionally, local devices may communicate with remote computers via a variety of protocols including Universal Serial Bus ("USB"), American Standard Code for Information Interchange ("ASCII") and Recommend Standard-232 ("RS-232").

The remote computer management system of the present invention may also be configured to connect varying quantities of user workstations 100 with varying quantities of remote computers 118. Preferably, the system according to the present invention allows eight (8) USTs 108 and thirty-two (32) CIMs to be connected via one MSU 112 while still achieving optimal signal transmission. If additional USTs or CIMs must be added, the system allows a plurality of MSUs 112 to be utilized to connect as many as sixty-four (64) user workstations 100 and ten thousand (10,000) remote computers 118.

Selection of a remote computer 118 from a user workstation 100 may be accomplished with a variety of methods. One such method is choosing a remote computer 118 from a menu or list displayed on the screen of the user station's video monitor 104. Such a menu or list may be generated by an option menu circuit within UST 108. The option menu circuit may be utilized to control the signaling circuitry located within CIM 116. The option menu circuit and display facilitates system programming and provides information useful for system operation. Furthermore, multiple security features such as passwords, system user histories, etc. may be implemented and operated in conjunction with the option menu circuit.

Figure 2:
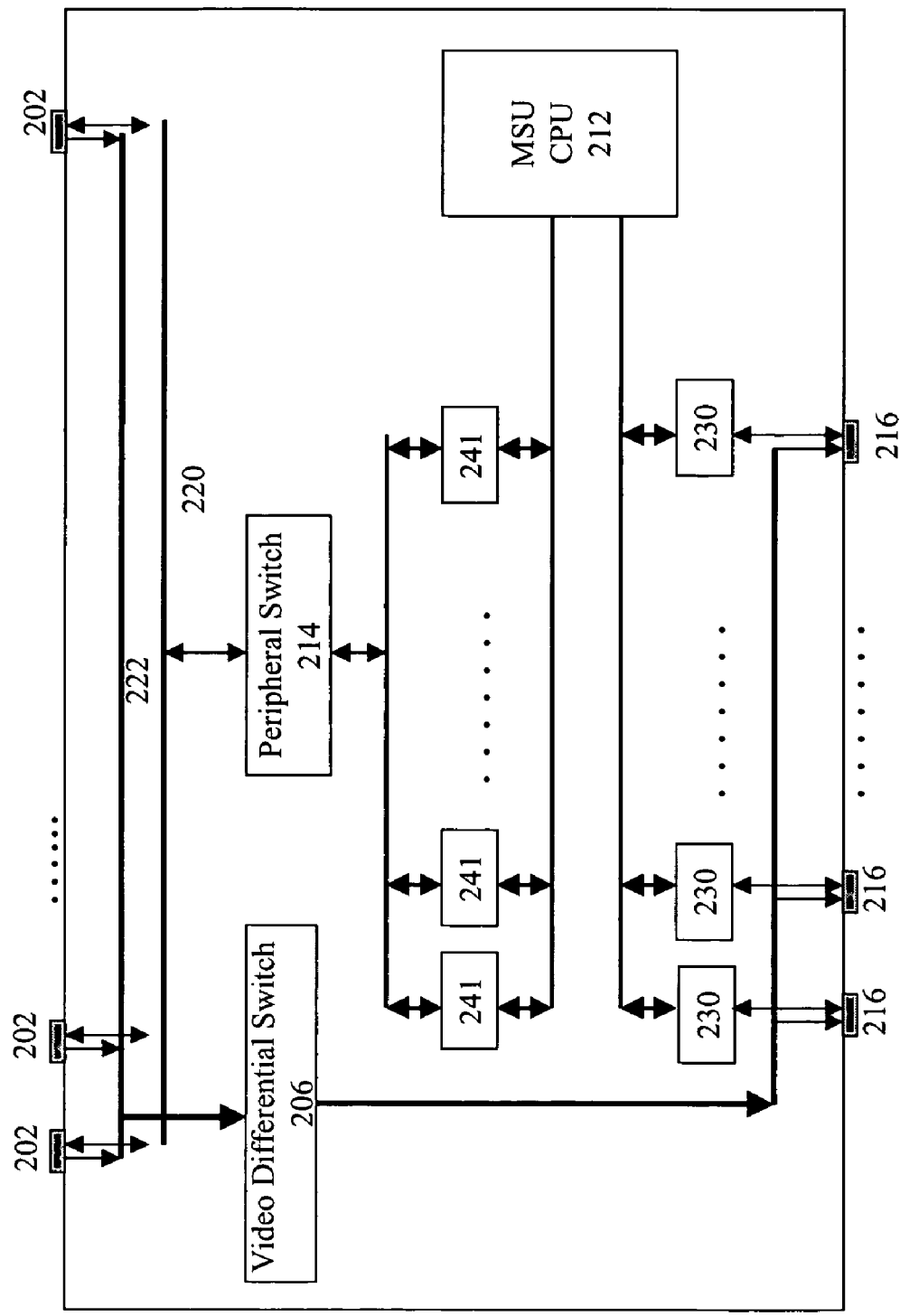
FIG. 2 is a block diagram of the MSU shown in FIG. 1 illustrating the internal structure of the MSU and the ports for connecting CAT 5 cables.

Turning next to FIG. 2, depicted is a schematic representation of the preferred embodiment of MSU 112, according to the invention, which enables multiple users to access and operate a plurality of connected computers. Access by a user to one of the connected computers from a local user workstation is performed completely via one or more MSUs 112, independent of any network that may couple the connected computers to each other such as a Local Area Network (LAN), Wide Area Network (WAN), etc. In other words, the computer management system of the present invention preferably does not utilize an existing computer network to allow a local user workstation to control the connected computers. Rather, all physical connections between the local user workstation and the connected computers can occur through one or more MSUs 112.

In the preferred embodiment, MSU 112 comprises a plurality of CIM ports 202 that are preferably RJ-45 sockets, which allow each CIM 116 to be connected to MSU 112 via an independent communication link 114 (FIG. 1). The unidirectionally transmitted (i.e., from the connected computer to the user workstation only) video signals are received at the MSU 112 through CIM ports 202 onto video bus 222, whereupon they are transmitted to video differential switch 206. Video differential switch 206 is capable of transmitting any video signals received from video bus 222 to any UST port 216. The transmitted video signals are then transmitted via independent communication link 110 to attached UST 108 (FIG. 1).

In addition to transmitting the unidirectional video signals, MSU 112 bi-directionally transmits keyboard and cursor control device signals between USTs 108 and CIMs 116 (FIG. 1). When transmitting the signals from one CIM 116 to one UST 108, these signals are received through CIM ports 202 on peripheral bus 220, whereupon they are transmitted to peripheral switch 214. Thereafter, peripheral switch 214 transmits these signals to the appropriate CIM universal asynchronous receiver transmitter ("UART") 241, which de-serializes the signals (i.e., converts the signals from a serial format to a format that is compatible with the MSU 112 (e.g., parallel format) and transmits them to central MSU processing unit ("CPU") 212. MSU CPU 212 analyzes the received signals and generates a new data packet based upon command information contained within the received signals. The new data packet is transmitted to the appropriate UST UART 230. UST UART 230 then serializes the signals and transmits them to the appropriate UST port 216 for transmission via independent communication link 110 to the appropriate UST 108 (FIG. 1).

Conversely, MSU 112 also transmits keyboard and cursor control device signals received at one UST 108 to one CIM 116 connected to a connected computer 118 (FIG. 1). The keyboard and cursor control device signals are received at UST 108 and transmitted via communication link 110 to the respective UST port 216 located at MSU 112. Thereafter, these signals are transmitted to UST UART 230, which de-serializes the signals and transmits them to MSU CPU 212. MSU CPU 212 interprets the information contained in the data packets of the received signals to create signals representing newly generated data packets. These new signals are then transmitted to the CIM UART 241 that is associated with the desired connected computer 118. CIM UART 241 serializes the signals and transmits them to peripheral switch 214, which transmits the signals to the desired CIM port 202 via peripheral bus 220. Subsequently, the keyboard and cursor control device signals are transmitted via communication link 114 to the appropriate CIM 116, which is connected to the desired connected computer 118 (FIG. 1).

Turning next to FIG. 3, shown is a schematic diagram of CIM 116. Preferably, each CIM 116 is compatible with all present day computer systems including, but not limited to, those manufactured by Microsoft (Windows), Apple (Macintosh), Sun (Solaris), DEC, Compaq (Alpha), IBM (RS/6000), HP (HP9000) and SGI (IRIX). However, as the technology of the present invention is generally operating system independent, it is foreseeable that the present invention will also be compatible with computer systems not yet contemplated.

CIM 116 connects video port 312, keyboard port 314 and cursor control device port 316 of connected computer 118 with MSU 112 via CAT 5 communication link 120 and port 300. Video signals are transmitted through CIM 116 unidirectionally from connected computer 118 to MSU 112. However, as discussed previously, keyboard and cursor control device signals may be transmitted bi-directionally between connected computer 118 and MSU 112.

During operation, video signals are transmitted from video port 312 of connected computer 118 to port 300 of CIM 116 via communication link 120. From port 300, the unidirectional video signals are transmitted to high-frequency boost circuitry 319 which applies the appropriate high-frequency boost to the video signal.

High-frequency boost circuitry 319 is under control of transmit controller 317. To determine the proper high-frequency boost, circuitry located in UST 108 sends the amplitudes of various components of the video signal to transmit controller 317. Transmit controller 317 then compares the amplitudes of the high-frequency components of the video signal to the amplitudes of the low frequency components of the video signal to determine the attenuation of the high-frequency components of the signal. If the high-frequency components are being attenuated, transmit controller 317 instructs high-frequency boost circuitry 319 to apply a boost to the high-frequency components of the video signal. The comparison can occur periodically (e.g., every 20 seconds), or alternatively the comparison can occur when a user switches to a new remote computer 118.

If the comparison occurs periodically, transmit controller 317 can either switch high-frequency boost circuitry 319 in or out of the circuit (thus essentially turning the boost off or on), or instruct high-frequency boost circuitry 319 to either increase or decrease the provided boost. Alternatively, the analysis may substantially occur at the receiving end of the video signal in which case transmit controller 319 may simply receive a control signal indicating that high-frequency boost circuitry 319 should be switched in or out of the circuitry, or indicating that high-frequency boost circuitry 319 should increase or decrease the boost.

High-frequency boost circuitry 319 may also be controlled manually by a user (e.g., a system administrator) through manual input 321. For example, manual input 321 may be connected to a dial located on the housing of CIM 116 which allows a user to manually control the high-frequency boost applied to the video signal by adjusting the dial. Alternatively, manual input 321 may be a circuit which interfaces high-frequency boost circuitry 319 to CIM CPU 306 which allows a user of the system to utilize the option menu to manually adjust the high-frequency boost applied to the video signal via software control.

High-frequency boost circuitry 319 may be any circuitry that boosts certain components of a video signal as is known in the art. Specifically, high-frequency boost circuitry 319 can include amplifiers, transistors and high-pass filters to correctly boost the high-frequency components of the video signal.

Once high-frequency boost circuitry 319 has applied the proper high-frequency boost to the video signal, the video signal is routed to video driver 304, which converts the standard red, green and blue video signals to a differential signal for transmission through port 302 to MSU 112 via communication link 114. Each color signal is transmitted via its own twisted pair of wires contained within communication link 114 (when transmitted from CIM 116 to MSU 112) or communication link 110 (when transmitted from MSU 112 to UST 108) (FIG. 1). Furthermore, video driver 304 appends the horizontal and vertical synchronization signals to one of the red, green or blue video signals to allow all five components of the video signals to be transmitted via only three twisted pair of wires of communication links 110 or 114. That is, the horizontal and vertical synchronization signals are each transmitted on its own color signal—not the same color signal. Preferably, the green signal includes the horizontal synchronization signal, and the blue signal includes the vertical synchronization signal.

Keyboard and cursor control device signals generated at connected computer 118 are received by CIM CPU 306 from keyboard port 314 and cursor control device port 316, respectively, via communication link 120 and port 300. CIM CPU 306 generates data packets representing the keyboard and cursor control device information in the received signals. The newly generated data packets are transmitted to UART 308, which serializes the signals and transmits them via communication link 114 to MSU 112 through port 302.

Conversely, keyboard and cursor control device signals received from the local user workstation through MSU 112 and communication link 114 (FIG. 1) are received at port 302. Thereafter, UART 308 de-serializes the received data packet signals and transmits them to CIM CPU 306. Alternatively, the received data packet signals may be de-serializes by a non-UART device. CIM CPU 306 uses the information contained in the data packet signals to emulate keyboard and cursor control device signals. These emulated signals are applied to keyboard port 314 and cursor control device port 316 through port 300 via communication link 120.

Furthermore, CIM 116 contains memory unit 410 (FIG. 4A), which stores identification information for CIM 116 and its connected remote computer 118 including their assigned name, group, address, etc. Thus, if a specific remote computer 118 is not functioning properly, it is easy to assess which remote computer 118 has malfunctioned. In addition, the CIM address facilitates proper transmission of the keyboard and mouse signals since the address of the desired CIM 116 is included in the keyboard and mouse data packets that are generated by MSU CPU 212. For example, if CIM 116 receives a data packet containing an address other than the CIM's address, the data packet may be returned to MSU CPU 212 for retransmission to the proper CIM 116. Furthermore, memory unit 410 allows CIM 116 and its connected remote computer 118 to be easily identified even if it is relocated and/or connected to a new MSU 112 or a new port of the same MSU 112. Upon reconnection of CIM 116, MSU 112 reads the identification information stored in the CIM's memory unit 410. This information allows MSU 112 to reconfigure or update the location of CIM 116, which ensures that the system continues to properly route information to CIM 116. This feature allows system administrators to easily reorganize CIMs 116 and remote computers 118 without reprogramming the system. Finally, in the preferred embodiment of the present invention, connected computer 118 provides power to CIM 116, thereby eliminating the equipment, cabling and space required for a dedicated CIM power source.

Figure 4A:
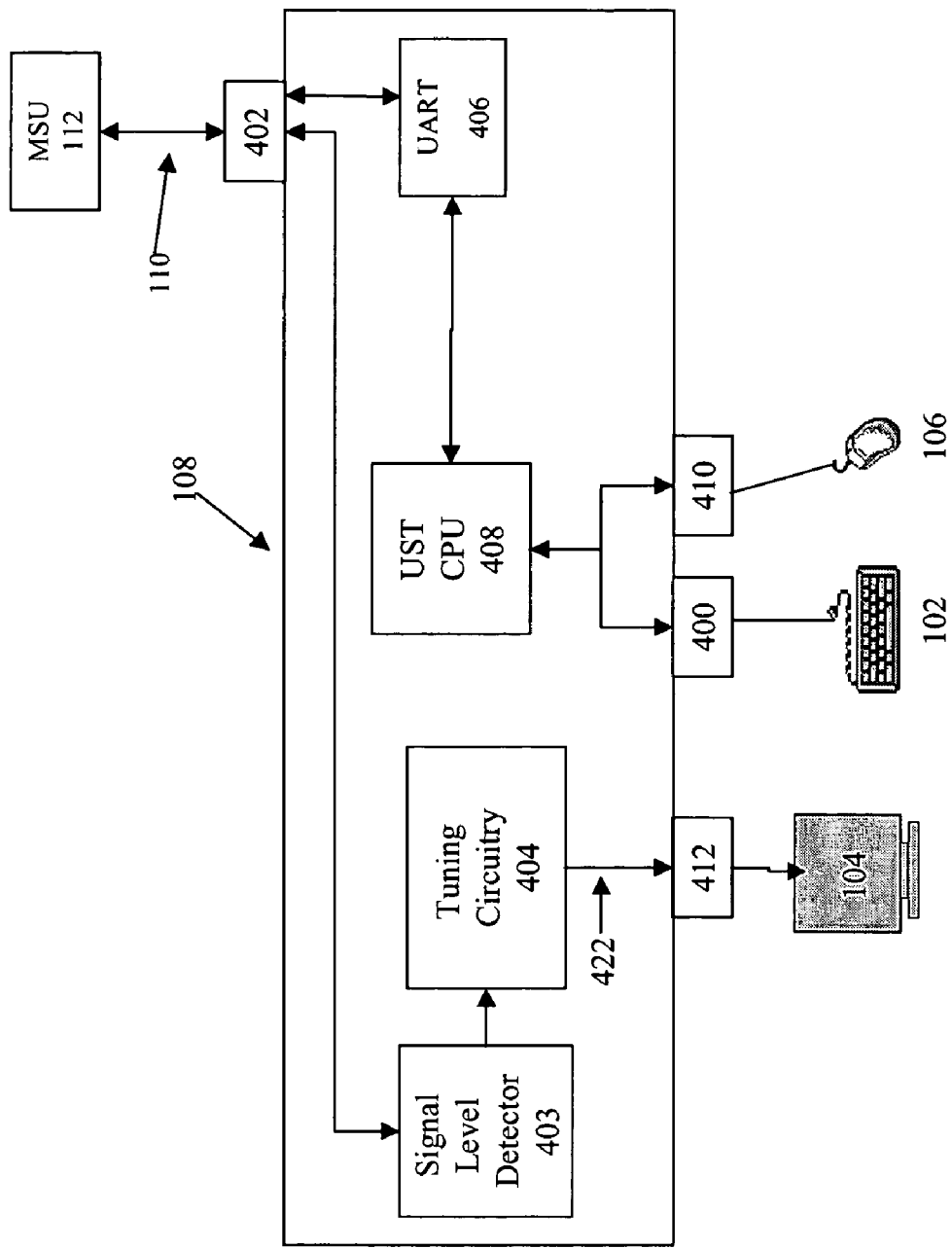
FIG. 4A is a block diagram of the UST shown in FIG. 1 depicting the attached peripheral devices, connection to the MSU via CAT 5 cabling, and the internal structure of the UST including frequency detection circuitry to control the boosting of the high-frequency components of the transmitted video signals according to the preferred embodiment of the present invention.

Turning next to FIG. 4A, depicted is a schematic diagram of the preferred internal structure of UST 108 according to the present invention. As shown, UST 108 couples keyboard 102, video monitor 104, and cursor control device 106 with MSU 112 (see FIG. 1). Signals generated by keyboard 102 and cursor control device 106 are received by UST CPU 408 via keyboard port 400 and cursor control device port 410, respectively, using industry standard connectors and cabling. Wireless keyboards and cursor control devices may also be used. UST CPU 408 then generates data packets that represent the keyboard and cursor control device information in the received signals. The newly generated data packets are transmitted to UART 406, whereupon they are converted to a serial format and transmitted through port 402 to MSU 112 via communication link 110. It should be noted that the converted data packets may alternatively be transmitted via a wireless connection, thereby eliminating the need for communication link 110.

Conversely, keyboard and cursor control device signals received from connected computer 118 (FIG. 1) through MSU 112 and communication link 110 are received at port 402. Thereafter, UART 406 de-serializes the received serial data packets and transmits them to UST CPU 408. Alternatively, a non-UART device may be used to de-serialize the received serial data packets. UST CPU 408 then uses the information contained in the data packets to emulate keyboard and cursor control device signals to keyboard 102 and cursor control device 106 via keyboard port 400 and cursor control device port 410, respectively.

Unidirectional video signals generated at connected computer 118 (FIG. 1) are also received at port 402 from MSU 112 via communication link 110. However, these video signals are transmitted to signal level detector 403 which analyzes the amplitudes of various frequencies within the video signal. Signal level detector 403 then transmits the amplitude information to transmit controller 317 located in UST 108. The amplitude information is utilized by transmit controller 317 to determine the signal-to-noise ratio of the transmitted video signal.

FIG. 4B depicts a block diagram of an alternate embodiment of signal level detector 403 utilized to determine the high-frequency boost needed to compensate for video signal degradation. In this embodiment, video compensation circuit 801 is utilized to compensate for the high-frequency attenuation of the video signal. Alternatively, the compensation may occur at circuitry disposed in the CIM. Level shift circuit 803, zero volt clip circuit 805, integration circuit 807, sample and hold circuit 809, signal conditioning circuit 811, A/D converter 813, processor 815, timing detection circuit 817, and control pulse generation circuit 819 are utilized to determine if the video signal is improperly under-compensated or over-compensated by video compensation circuitry 801. In this embodiment, it is preferable that synchronization information transmitted with the green and blue components of the video signal is utilized to determine the necessary boost to compensate for high-frequency attenuation.

Initially, a composite video signal (e.g., the green component of the video signal combined with the horizontal synchronization signal), is fed to the circuit of FIG. 4B from which the synchronization information is extracted by timing detection circuit 817.

Simultaneously, the composite video signal is fed through video compensation circuit 801 to level shift circuit 803. The black level of the signal is shifted and clipped at zero volts by level shift circuit 803 and zero volt clip circuit 805. This ensures that the signal entering integration circuit 807 is of known amplitude.

The area of the video signal following the synchronization pulse (as determined by timing detection circuitry 817) is integrated by integration circuit 807 to give a measure of high-frequency attenuation or over amplification. Specifically, timing detection circuit 817 instructs control pulse generation 819 to communicate to integration circuit 807 what portion of the signal should be integrated. Integrator circuit 807 converts the signal to a ramp signal, and the peak voltage of the ramp is extracted from integrator circuit 807, as is a DC level. The DC level of the signal is then adjusted to be of a suitable range for the A/D converter 813 input to processor 815. Processor 815 then utilizes the digitized signal as an input to an algorithm that determines whether or not the compensation level needs to be increased or decreased. Thus, the system depicted in FIG. 4B provides a quantifiable measurement of the level of compensation required and a highly accurate level of compensation. The individual components of the system depicted in FIG. 4B are now discussed in further detail.

Figure 4C:
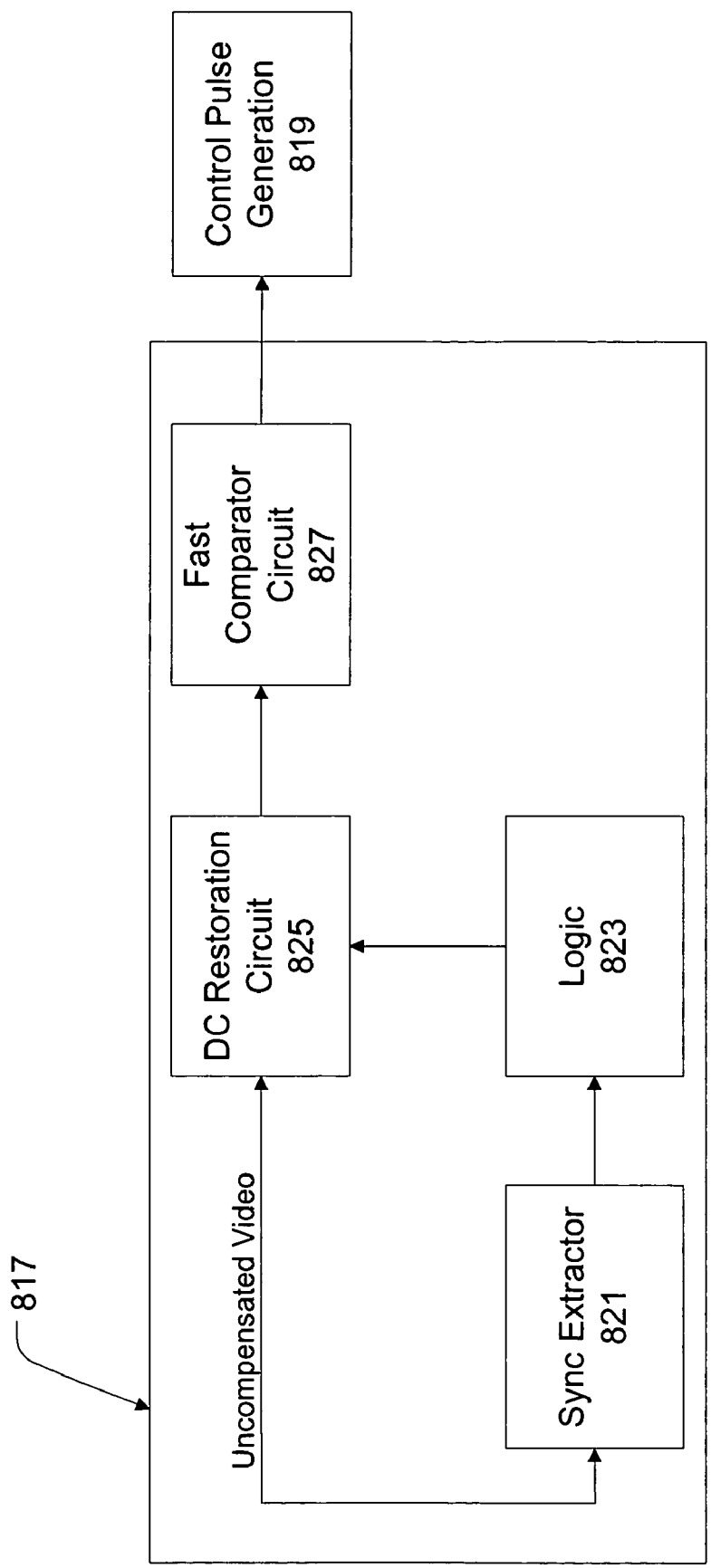
FIG. 4C is a schematic representation of the timing detection circuitry depicted in FIG. 4B.

FIG. 4C shows a schematic diagram of the elements of timing detection circuit 817. As the diagram shows the uncompensated video signal is fed to DC restoration circuit 825 and synchronization extractor 821. Synchronization extractor 821 is connected to logic circuit 823 which is attached to DC restoration circuit 825. In turn, DC restoration circuit 825 is attached to fast comparator circuit 827 from which the signal is fed to control pulse generation circuit 819.

DC restoration circuit 825 is utilized to ensure that the black level of the video signal is at zero volts. A first input to DC restoration circuit 825 is a hold pulse. The hold pulse is generated using synchronization extractor 821, and logic circuit 823. A synchronization extractor is a commercially available circuit or processor known in the art to remove synchronization signals from composite signals.

The DC restored uncompensated video is used as one input to fast comparator circuit 827. Fast comparator circuit 827 compares this input with an internally generated reference level (e.g., generated by a voltage divider from the power supply rails contained within fast comparator circuit 827). Fast comparator circuit 827 compares the two inputs and when the uncompensated video crosses the reference level it generates a logic pulse. This is the reference timing pulse that is closely aligned with the video synchronization signal.

As is known in the art, a composite video signal that includes a component of the video signal and synchronization signals on the same line is encoded such that the video signal is a positive voltage and the synchronization signal is a negative pulse. Thus, the purpose of the circuit depicted in FIG. 4C is to locate this negative pulse and to output a closely aligned timing pulse.

Referring back to FIG. 4B, the timing pulse is utilized by control pulse generation circuit 819 to supply a control pulse to integration circuit 807. Control pulse generation circuit 819 also supplies a "sample and hold" pulse to sample and hold circuit 809.

Integration circuit 807 also receives video signals that have been conditioned by level shift circuit 803 and zero volt clip circuit 805. Specifically, the incoming video signal is DC restored to ensure that the black level of the video signal is at zero volts. Further, the video signal is conditioned to remove any DC error. This is done by shifting the video signal 300 mV positive and clipping the signal at zero volts.

Figure 5:
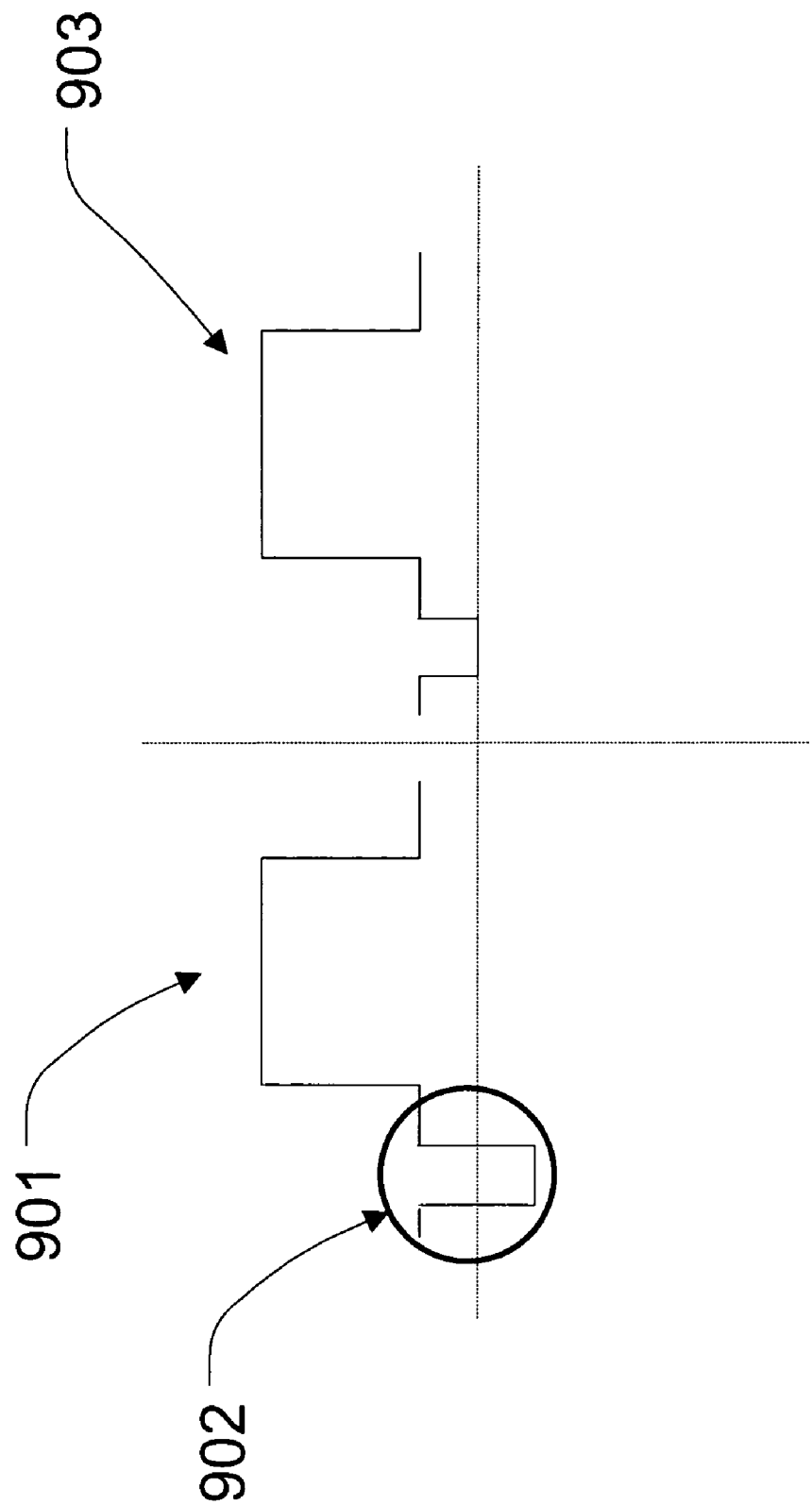
FIG. 5 depicts the results of a video signal processed by the level shift and zero volt clip circuits depicted in FIG. 4B.

FIG. 5 depicts a sample video signal that has been conditioned by level shift circuit 803 and zero volt clip circuit 805. Specifically, FIG. 5 depicts raw video signal 901, and conditioned video signal 903 which has been conditioned by level shift circuit 803 and zero volt clip 805. Notably, raw video signal 901 contains synchronization portion 902 which is of negative voltage, and which corresponds to the negatively encoded synchronization signal that comprises the unconditioned video signal. The signal is conditioned such that this pulse is no longer negative, but instead has a minimum of zero volts. Further, conditioned video signal 903 is of known amplitude.

Conditioned video signal 903 is then fed to integration circuit 807 (FIG. 4B), along with an integration pulse supplied by control pulse generation circuit 819 which instructs integration circuit 807 to integrate the area of conditioned signal 903 after the synchronization pulse in order to give a measure of frequency compensation.

Figure 6:
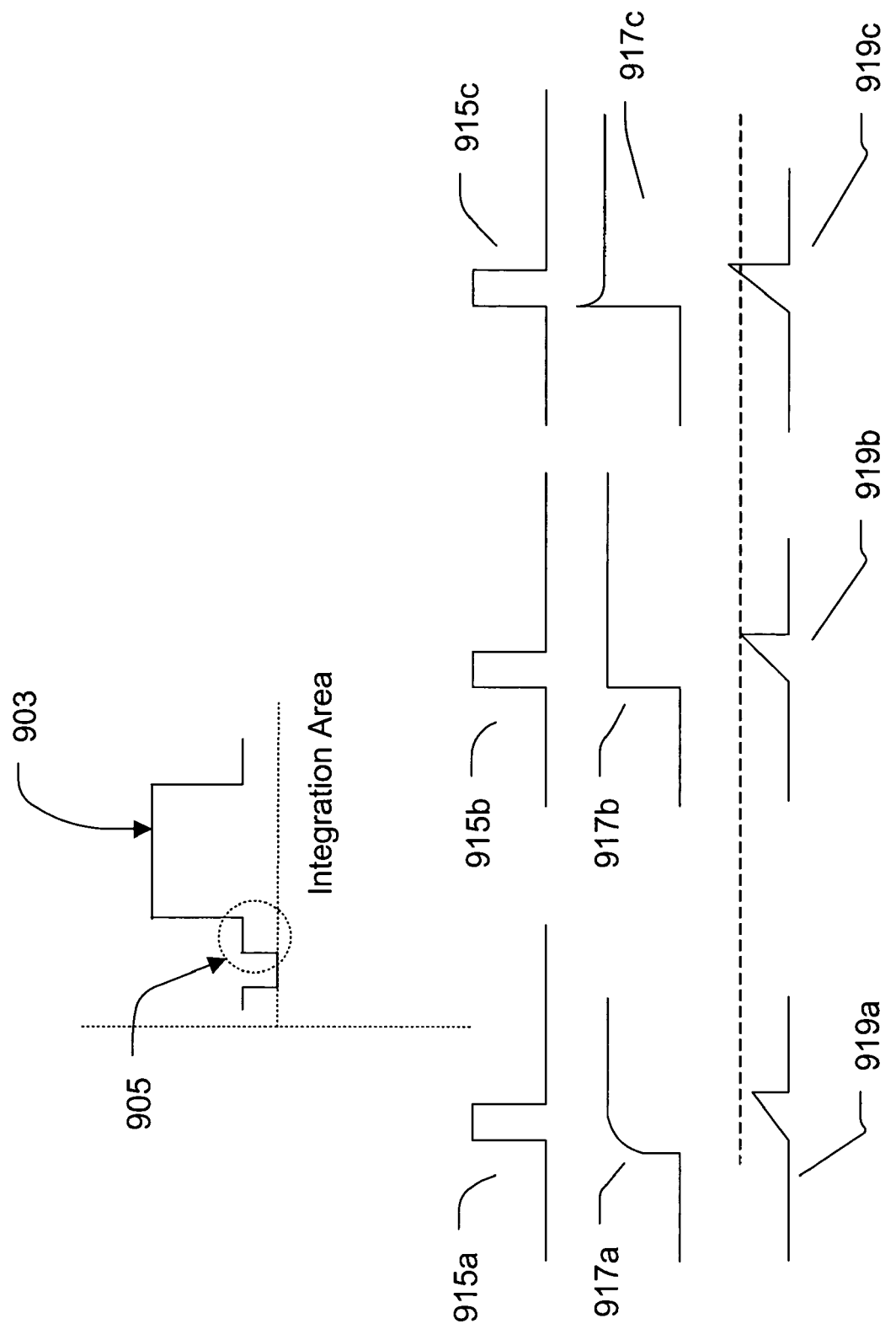
FIG. 6 depicts the results of the frequency attenuation detection circuitry analyzing an under-compensated, a correctly compensated, and an over-compensated video synchronization signal.

The integration of conditioned video signal 903 is illustrated more fully in FIG. 6. Specifically, integration circuit 807 integrates signal portion 905, determining the area underneath this portion of the signal.

Signals 917a-c represent sample signal portions for under-compensated, correctly compensated, and over-compensated video signals. Specifically, signal 917a is under-compensated (i.e., the high-frequency component of the signal is clearly attenuated) thus leading to the "dull" edge. Signal 917b is correctly compensated (i.e., the synchronization signal is a clean square pulse). Finally, signal 917c is over-compensated, (i.e., the high-frequency components of the signal have too high of an amplitude). Integration pulses 915a-c are utilized by integration circuit 807 for each of signals 917a-c to locate the signal portion 905 to be integrated.

Integration outputs 919a-919c represent the outputs of integration circuit when integrating signals 917a-c respectively. As can be seen in FIG. 6, the outputs are ramp signals, where the maximum value of the ramp is an indication of the need to increase or decrease the compensation of the high-frequency components of the video signal.

The ramp signal is fed to sample and hold circuit 809 (FIG. 4B), along with a sample and hold signal supplied by control pulse generation circuit 819. Sample and hold circuit 809 captures the peak value of the ramp signal and provides a signal indicative of this value to A/D converter 813. Alternatively, sample and hold circuit 809 can determine the slope of the ramp signal, which is similarly an indication as to whether the high-frequency components of the video signal are under-boosted or over-boosted. Finally, A/D converter provides processor 815 with a digitized word as an input to an algorithm which determines whether the compensation of the high-frequency component of the video needs to be adjusted.

Figure 7:
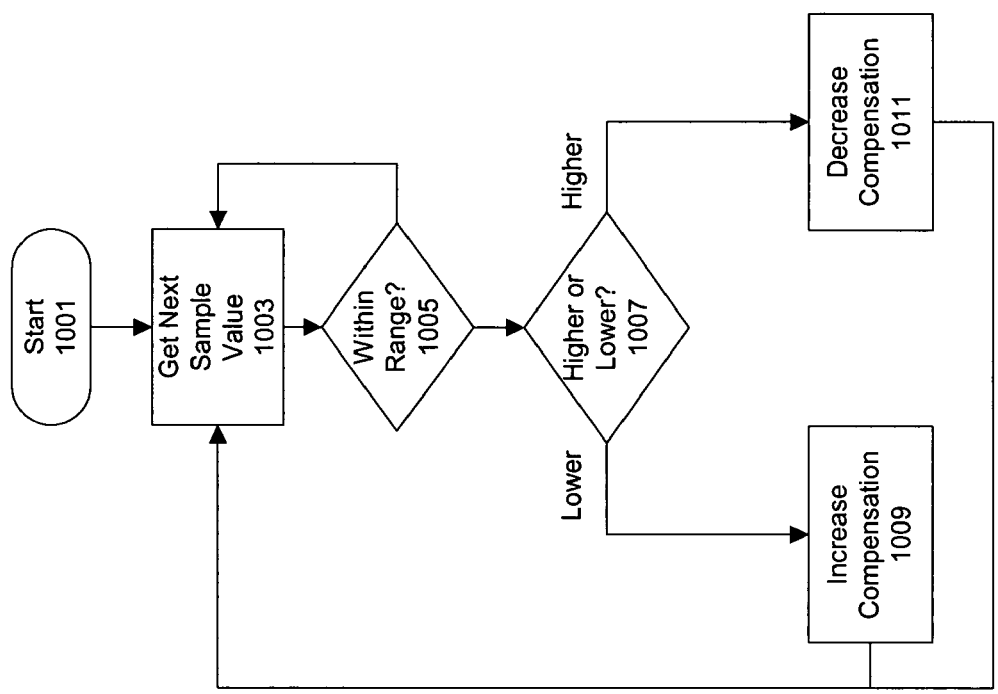
FIG. 7 is a flow chart of the software utilized by the processor of FIG. 4B to send control signals to increase or decrease the high-frequency boost applied to transmitted video signals.

FIG. 7 is a block diagram of the algorithm utilized by processor 815. Processor 815 utilizes this algorithm and the input from A/D converter 813 to generate control signals for high-frequency boost circuitry 319 or video compensation circuit 801 indicating that the high-frequency signals should either be increased or decreased.

After the algorithm starts (step 1001), it receives a sample value from A/D converter 813 (step 1003). If the sample value is within a predefined range of acceptable values (step 1005), the processor returns to step (1003), as this is an indication that the video signal is being correctly compensated for any high-frequency attenuation.

If the sample value is below the predefined range of acceptable values (step 1005), the processor sends a control signal to increase compensation (step 1009), because such a sample value is an indication that the video signal is being under-compensated for the high-frequency attenuation in the signal. The next sample signal received (step 1003) will have an increase compensation of the high-frequency components of the video signal.

Finally, if the sample value is higher than the predetermined range (step 1007), then the processor sends a decrease compensation control signal (step 1011) because such a sample value is an indication that the video signal is being over-compensated for the high-frequency attenuation in the signal. The next sample signal received (step 1003) will have a decreased compensation of the high-frequency components of the video signal.

Figure 4D:
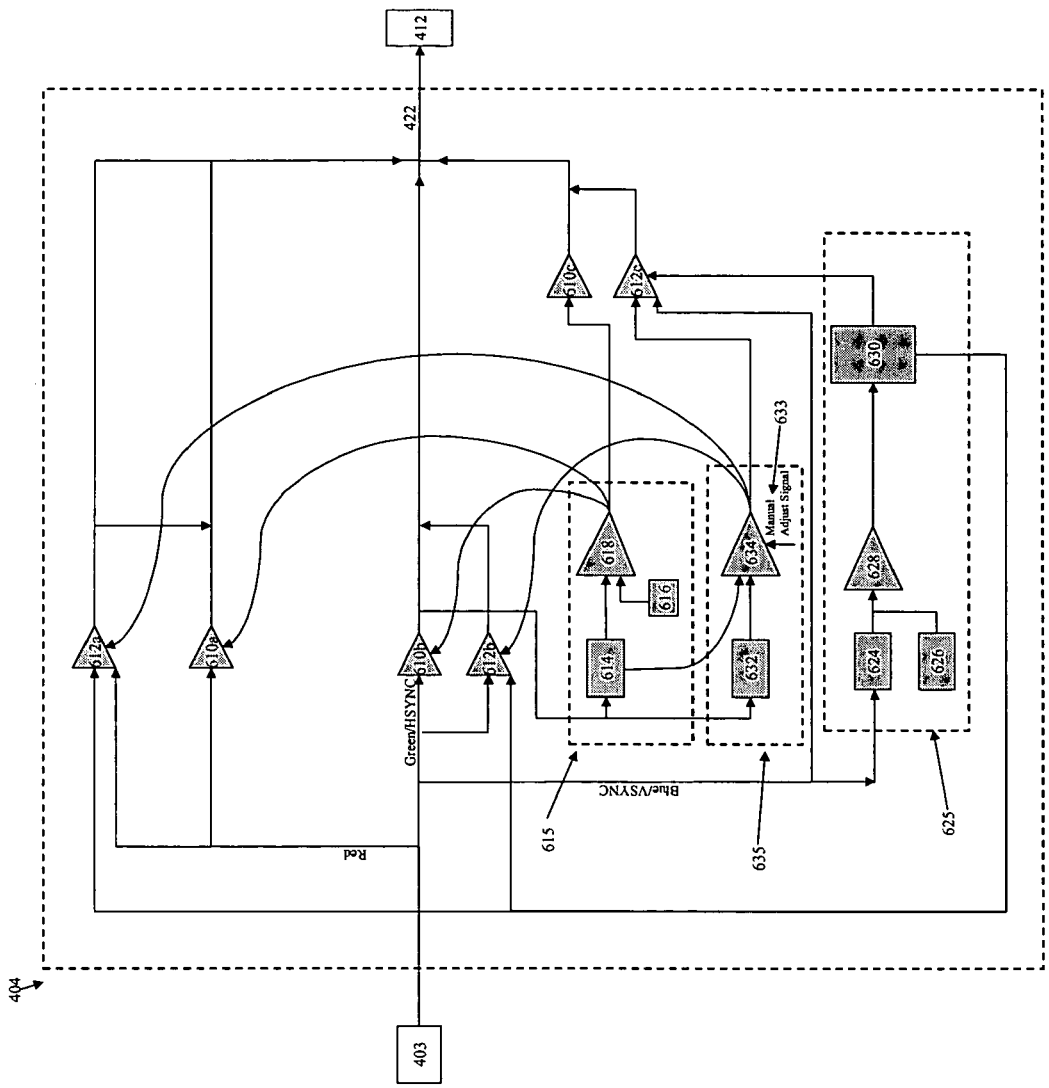
FIG. 4D is a block diagram of the tuning circuit depicted in FIG. 4A.

After the video signal has been analyzed to determine the necessary high-frequency boost, it is routed to tuning circuit 404 (FIG. 4A), which tunes the video signals to a desired amplitude and frequency. As shown in FIG. 4D, tuning circuit 404 preferably comprises red variable gain amplifier 610a, green variable gain amplifier 610b, blue variable gain amplifier 610c, red frequency compensation amplifier 612a, green frequency compensation amplifier 612b, blue frequency compensation amplifier 612c, slow peak detector 614, voltage source 616, comparator 618, slow peak detector 624, voltage source 626, comparator 628, video switch 630, fast peak detector 632, and comparator 634.

During system operation, the video signals generated at connected computer 118 are transmitted via communication link 120 to CIM 116 (FIG. 1). Thereafter, the video signals are transmitted from CIM 116 to MSU 112 via communication link 114 (FIG. 1). At this point the amplitudes of the transmitted video signals may be significantly reduced and the frequencies of the video signals may be attenuated. Subsequently, the video signals are further transmitted from MSU 112 to UST 108 via communication link 110, wherein the amplitudes and frequencies of the video signals experience further degradation. Therefore, tuning circuit 304 is implemented to automatically tune the received video signals to achieve the desired amplitude and frequency.

In the preferred embodiment, the horizontal synchronization signal is encoded on and transmitted with the green video signal, and the vertical synchronization signal is encoded on and transmitted with the blue video signal. However, the horizontal and vertical synchronization signals may be encoded on and transmitted with any one of the red, green, or blue video signals. Also, it is preferable that the horizontal and vertical synchronization signals are encoded as negative pulses, since the video signals (i.e., red, green, and blue) are typically positive pulses.

The components of tuning circuit 304 combine to create three dedicated signal tuning circuits (i.e., one for each of the red, blue, and green video color signals), a gain amplification adjustment circuit 615, a frequency compensation amplification adjustment circuit 635, and an additional filtering enablement circuit 625.

In operation, the red component of the video signals is initially transmitted to red variable gain amplifier 610a and red frequency compensation amplifier 612a. Preferably, red variable gain amplifier 610a adjusts the amplitude of the red component of the video signals based upon the output of gain amplification adjustment circuit 615. Concurrently, red frequency compensation amplifier 612a adjusts the frequency of the red component of the video signals based upon the output of frequency compensation amplification adjustment circuit 635. The outputs of red variable gain amplifier 610a and red frequency compensation amplifier 612a are electrically combined and transmitted via wire 422 to video switch 314 (FIG. 4A).

The green component of the video signals, including the encoded horizontal synchronization signal, is transmitted to green variable gain amplifier 610b and green frequency compensation amplifier 612b. The two outputs are then electrically combined and transmitted to gain amplification adjustment circuit 615 and frequency compensation amplification adjustment circuit 635. Gain amplification circuit 615 comprises slow peak detector 614, which receives the electrically combined outputs of green variable gain amplifier 610b and green frequency compensation amplifier 612b. Slow peak detector 614 detects the amplitude of the horizontal synchronization signal, which is encoded on the green component of the video signals, and transmits a signal representing this amplitude to comparator 618 and comparator 634. Comparator 618 then compares the signal received from slow peak detector 614 to a constant reference voltage supplied by voltage source 616. The signal supplied by voltage source 616 represents the desired amplitude for the horizontal synchronization signal. Next, comparator 618 transmits a signal to red variable gain amplifier 610a, green variable gain amplifier 610b, and blue variable gain amplifier 610c to adjust the level of amplification of the red, green, and blue components of the video signals until the desired amplitude is achieved.

Similarly, green frequency compensation amplifier 612b adjusts the level of amplification of the frequency of the horizontal synchronization signal based upon the output of frequency compensation amplification adjustment circuit 635. Frequency compensation amplification adjustment circuit 635 comprises fast peak detector 632 that also receives the electrically combined outputs of green variable gain amplifier 610b and green frequency compensation amplifier 612b. Fast peak detector 632 detects the rising edge of the horizontal synchronization signal and transmits a signal representing this rising edge to comparator 634. Then, comparator 634 compares the signal received from fast peak detector 632 to the output of slow peak detector 614 to compare the amplitude of the rising edge of the horizontal synchronization signal pulse to the amplitude of the horizontal synchronization signal pulse itself. Next, comparator 634 sends a signal that is fed to red frequency compensation amplifier 612a, green frequency compensation amplifier 612b, and blue frequency compensation amplifier 612c to adjust the level of amplification of the red, green, and blue components of the video signals until the desired frequency is achieved. Optionally, a system administrator may manually adjust the signal transmitted by comparator 634, whereupon this adjustment is input to tuning circuit 304 via manual input 633. Such a feature would allow the system user to manually "tweak" the gain of the video signals until a desired video output is achieved.

The blue component of the video signals, along with the encoded vertical synchronization signal, is initially transmitted to blue variable gain amplifier 610c, blue frequency compensation amplifier 612c, and filtering enablement circuit 625, which is employed to increase the range of red frequency compensation amplifier 612a, green frequency compensation amplifier 612b, and blue frequency compensation amplifier 612c when the video signals have been transmitted over approximately four hundred fifty (450) feet. The vertical synchronization signal, which is encoded on the blue component of the video signals as a precise square wave signal of known duration and amplitude, is used as a precise reference point for filtering enablement circuit 625. The blue component of the video signals and the encoded vertical synchronization signal are received by slow peak detector 624, which detects the amplitude of the vertical synchronization signal. Slow peak detector 624 transmits a signal representing the amplitude of the vertical synchronization signal to comparator 628, which compares it to the known amplitude of a similar signal transmitted for four hundred fifty (450) feet. This known amplitude is represented by a constant reference voltage applied to comparator 628 by voltage source 626. If comparator 628 determines that the vertical synchronization signal (and therefore all of the video signals) has been transmitted over four hundred fifty (450) feet, a signal indicating this is transmitted to video switch 630. Video switch 630 then sends a signal to red frequency compensation amplifier 612a, green frequency compensation amplifier 612b, and blue frequency compensation amplifier 612c to increase the range of each frequency compensation amplifier 612a, 612b, and 612c.

Figure 8:
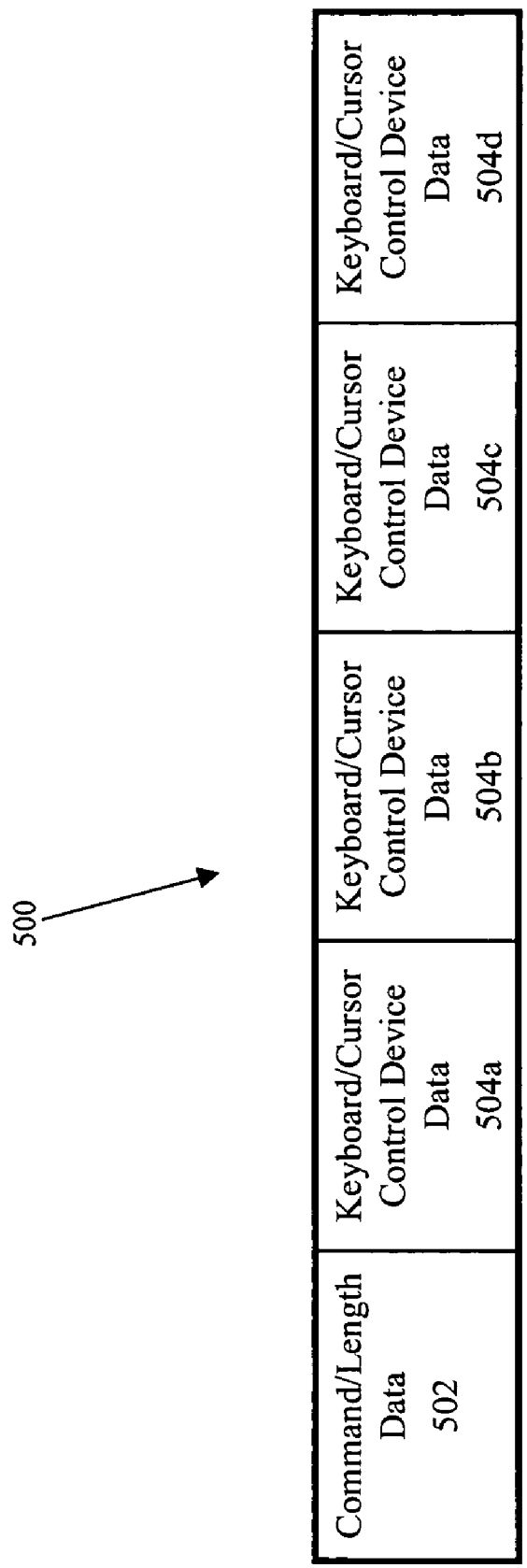
FIG. 8 is a schematic representation of a data packet used to transmit data in the computer management system according to the preferred embodiment of the present invention.

Referring next to FIG. 8, provided is an example of a data packet used to transmit keyboard and cursor control device information. In the example, protocol data packet 500 consists of five bytes. First byte 502 comprises the instructional, or command, data and data regarding the total length of data packet 500. That is, the first half of first byte 502 contains the command data and the second half of first byte 502 contains the length data. The subsequent four bytes 504a-d include the characters typed on keyboard 102 and clicks performed with cursor control device 106 (FIG. 1).

It is well known in the art to transmit command and length data in separate bytes. Therefore, utilizing conventional data packet technology, the data packet of the present invention would need to contain six bytes (i.e., one byte for command data, one byte for length data and four bytes for system data). In contrast, the preferred embodiment of the present invention minimizes the size of the data packet by combining the command and length data into one byte, thereby allowing four bytes of system data to be transmitted in a five-byte data packet. Consequently, signal transmission in the intelligent, modular server management system of the present invention is more efficient, allowing a single CAT 5 cable to be used for transmission of keyboard, cursor control device and video signals.

Figure 9:
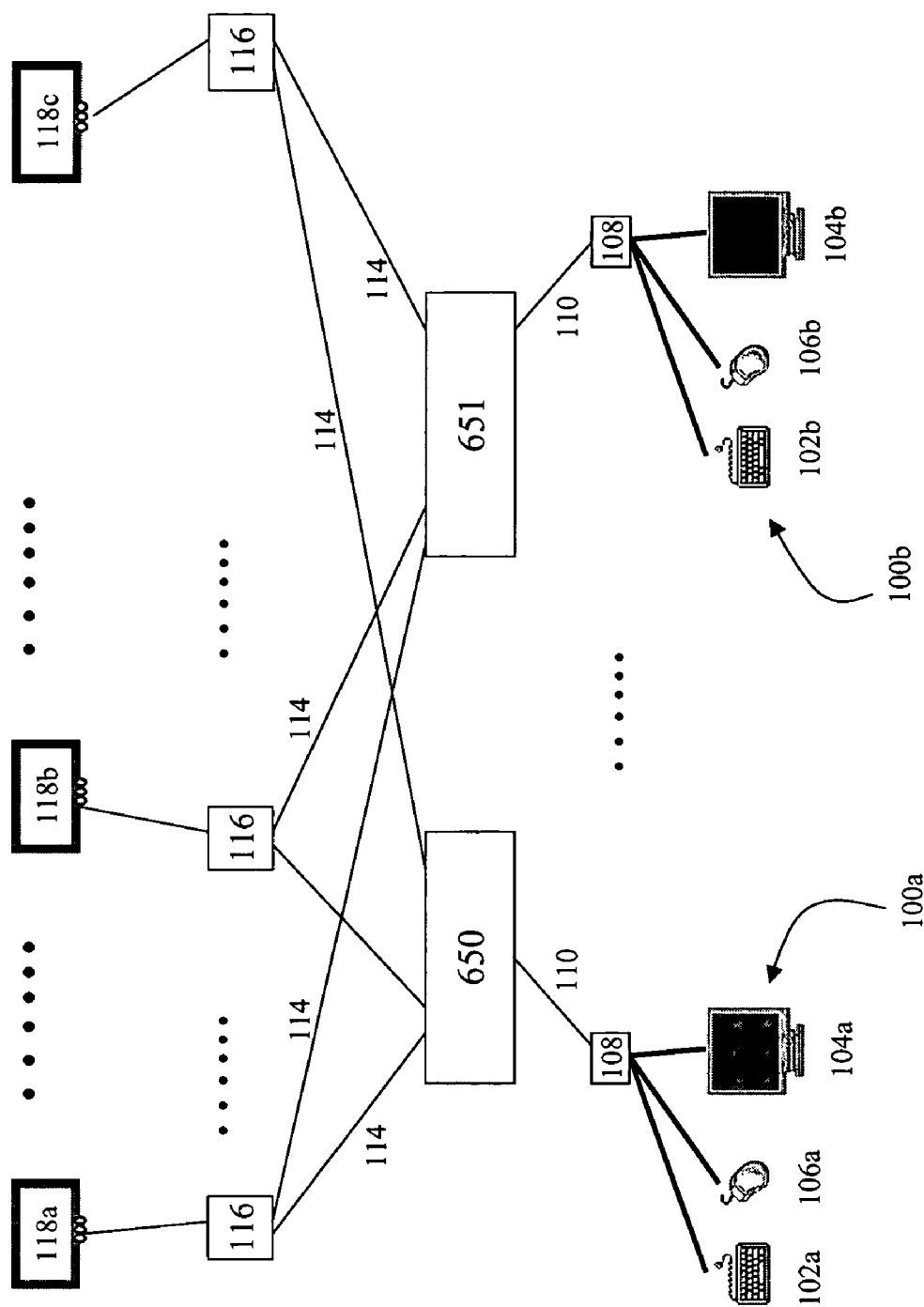
FIG. 9 is a schematic representation of an alternate configuration of a KVM remote computer management system according to the invention.

Referring next to FIG. 9, disclosed is an alternate embodiment of the intelligent, modular computer management system of the present invention in which the system is expanded to include two (2) MSUs 112, each having eight (8) inputs and thirty-two (32) outputs. This configuration allows sixteen (16) USTs 108 to access and operate thirty-two (32) connected computers 118. In this alternate embodiment, each UST 108 may be linked to either first MSU 650 or second MSU 651 via communication link 110. All signals received at UST 108 are transmitted via its connected MSU (i.e., either first MSU 650 or second MSU 651) to CIM 116 that is connected to the desired connected computer 118. In this alternate embodiment, CIM 116 provides connectors for two (2) communication links 114 to allow it to connect to both first MSU 650 and second MSU 651. Thus, CIM 116 allows sixteen (16) user workstations 100 to operate thirty-two (32) connected computers 118. In addition, this embodiment allows two (2) user workstations 100 to simultaneously access and operate the same connected computer 118. Alternatively, this embodiment allows a first user workstation 100 to inform a second user workstation 100 that a connected computer 118 is in use and, therefore, access to it is restricted.

Figure 10:
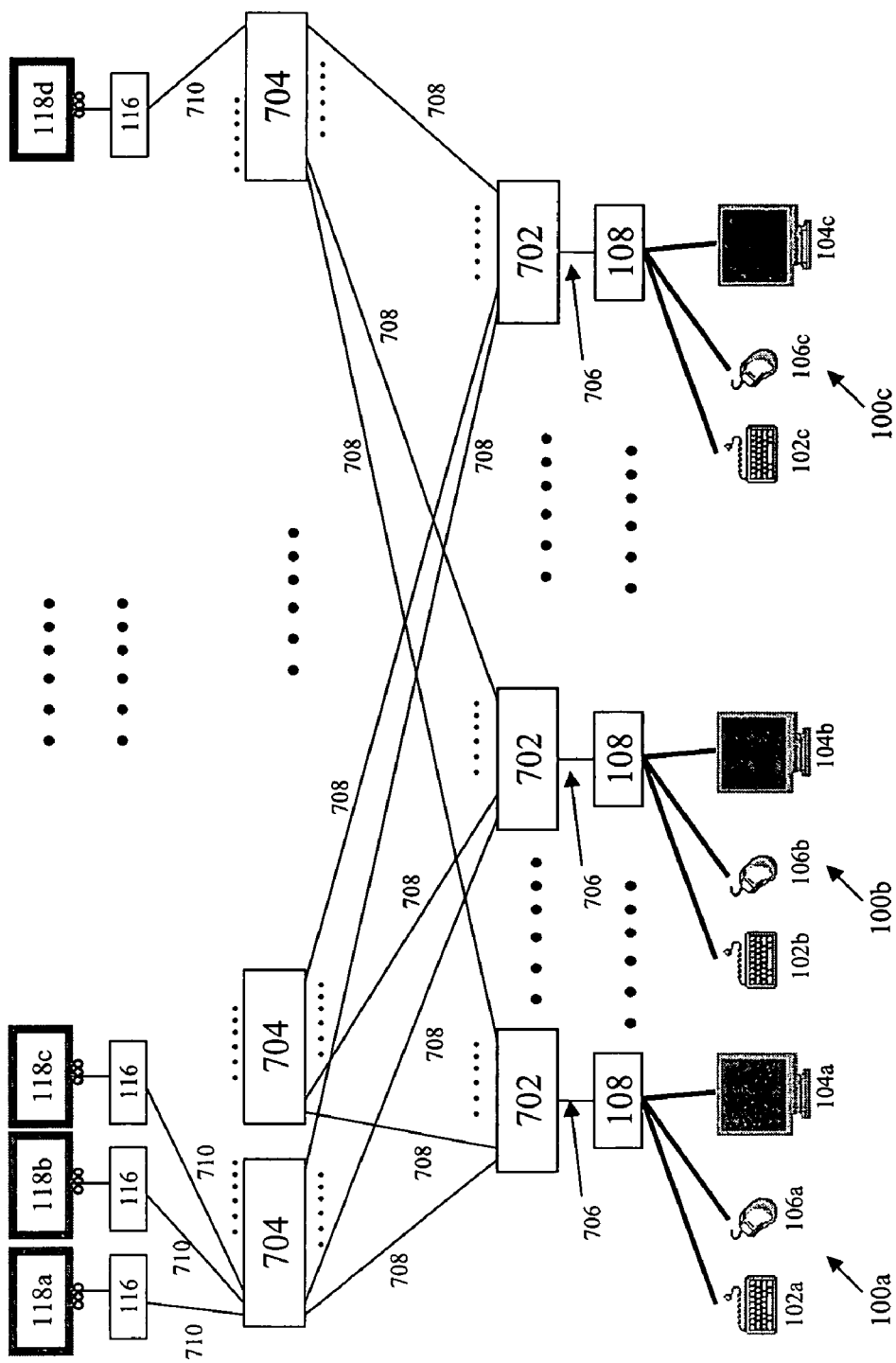
FIG. 10 is a schematic representation of yet another alternate configuration of a KVM remote computer management system according to the invention.

Referring next to FIG. 10, disclosed is another alternate embodiment of the intelligent, modular server system of the present invention. The use of forty (40) total MSUs (i.e., eight (8) first tier MSUs 702 and thirty-two (32) second tier MSUs 704), wherein each first tier MSU 702 and second tier MSU 704 has eight (8) inputs and thirty-two (32) outputs, allows sixty-four (64) user workstations 100 to operate and access one thousand twenty four (1,024) connected computers 118. In this alternate embodiment, each UST 108 is directly linked to one of eight (8) first tier MSUs 702 via single CAT 5 cable 706. First tier MSU 702 transmits all signals received from user workstation 100 via single CAT 5 cable 708 to second tier MSU 704 that is connected to the CIM 116 associated with the desired connected computer 118. Second tier MSU 704 then transmits the received signals to the respective CIM 116 via single CAT 5 cable 710, whereupon CIM 116 applies these signals to the respective ports of connected computer 118. In this embodiment, the second tier of MSUs 704 comprises thirty-two (32) units. Each second tier MSU 704 is coupled to multiple CIMs 116, which provide a direct connection to each of the one thousand twenty four (1,024) potential connected computers 118 via single CAT 5 cables 710.

Although FIG. 7 depicts the configuration used to access and control one thousand twenty four (1,024) connected computers 118 from sixty-four (64) user workstations 100, many other system configurations are available to allow a greater number of user workstations 100 to be connected to a greater number of connected computers 118. For example, the number of MSU tiers may be increased, or, alternatively, hubs may be incorporated. Also, each MSU may be designed to comprise more than eight (8) inputs and more than thirty-two (32) outputs to further increase the system capacity.

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A system for compensating for high-frequency attenuation of transmitted video signals, said system comprising:
   a user workstation of the type including a keyboard, cursor control device and monitor;
   an interface module;
   a communications link for providing video signals transmitted from a remote device and data signals transmitted from the remote device;
   a video receiving circuit in the user workstation for receiving said transmitted video signals from said remote device and for measuring amplitudes of a low frequency component and a high frequency-component of said transmitted video signals;
   a video signal analyzing circuit in the interface module coupled to said video receiving circuit for determining an attenuation of said high frequency component components of said transmitted video signals based on said measuring and for generating a control signal; and
   a video signal amplifying circuit in the interface module for amplifying the transmitted video signals to compensate for the amplitude attenuation of said high frequency component components of said the transmitted video signals in response to the control signal.

2. The system according to claim 1, wherein said control signal identifies an amount of amplification to be applied to said high frequency component by said amplifying circuit.

3. The system according to claim 1, wherein said video signal analyzing circuit compares amplitudes of a first group of said transmitted high frequency component of said transmitted video signals having a magnitude greater than a first predetermined magnitude to amplitudes of a second group of said low frequency component of said transmitted video signals having a magnitude less than a second predetermined magnitude.

4. The system according to claim 1, wherein said amplifying circuit amplifies said high frequency component of said transmitted video signals having a magnitude greater than a first predetermined magnitude.

5. The system according to claim 1, further comprising a tuning circuit for adjusting said amplifying circuit.

6. The system according to claim 5, wherein said tuning circuit is manually controlled.

7. A video signal system for enhancing high frequency video signal components for transmission, said system comprising:
   a user workstation of the type including a keyboard, cursor control device and monitor;
   an interface module;
   a communications link for providing video signals transmitted from a remote device and data signals transmitted from the remote device;
   an extraction circuit in the user workstation for extracting video components and synchronization signals from a composite video signal transmitted from said remote device;
   a synchronization signal analyzing circuit in the user workstation for analyzing said synchronization signals to determine an attenuation of high frequency components of said synchronization signals and for generating a control signal; and
   a signal amplifying circuit in the interface module for amplifying one or more of said high frequency video components of the composite video signal in response to said control signal.

8. The system according to claim 7, said system further comprising:
   a tuning circuit for adjusting said amplifying circuit.

9. The system according to claim 8, wherein said tuning circuit is manually controlled.

10. The system according to claim 7, wherein said synchronization signal analyzing circuit includes circuitry for converting said synchronization signals to ramp signals.

11. The system according to claim 10, wherein said synchronization signal analyzing circuit further includes an analog to digital converter for digitizing said ramp signals.

12. The system according to claim 11, wherein said synchronization signal analyzing circuit further includes a processor for analyzing said digitized ramp signals.

13. The system according to claim 12, wherein said control signal is indicative of a maximum value for said ramp signals.

14. The system according to claim 13, wherein said synchronization signal analyzing circuit includes circuitry for shifting a voltage of said composite video signal by a predetermined positive amount.

15. The system according to claim 14, wherein said synchronization signal analyzing circuit includes circuitry for removing a portion of said synchronization signals having a voltage below zero volts.

16. The system according to claim 15, wherein said circuitry for removing said portion of said synchronization signals provides said converting circuitry for converting said synchronization signals with a signal of known amplitude.

17. The system according to claim 13, wherein said synchronization signal analyzing circuit includes circuitry for filtering said maximum value of said ramp signals.

18. The system according to claim 10, wherein said synchronization signal analyzing circuit includes circuitry for conditioning said ramp signals.

19. A method of compensating for attenuation of high frequency components of video signals, said method comprising the steps of:

receiving video signals and data signals at an interface module from a remote device over a single communications link;

measuring amplitudes of a plurality of high frequency components and low frequency components of said received video signals at a user workstation of the type containing at least one of a monitor, keyboard or cursor control device;

analyzing at the interface module said high frequency components of said received video signals to determine an attenuation of the high frequency components of said received video signals based on the measuring step;

generating a control signal in the interface module indicative of said attenuation of said high frequency components; and amplifying said high frequency components of said video signals at the interface module to compensate for the attenuation of the high frequency components in response to said control signal.

20. The method according to claim 19, wherein said control signal identifies an amount of amplification to be applied to said video signals.

21. A method of compensating for high frequency attenuation of transmitted video signals, said method comprising the steps of:

receiving composite video signals and data signals at an interface module from a remote device over a single communications link;

separating the received composite video signals from the received data signals;

extracting video components and synchronization components at a user station from said composite video signals transmitted from the remote device;

analyzing high frequency and low frequency components of said synchronization components to determine an attenuation of said high frequency synchronization components;

generating a control signal indicative of said attenuation of said high frequency synchronization components;

transmitting said control signal to the interface module; and amplifying high frequency video components of the video signals based on said determined attenuation in response to said control signal.

22. The method according to claim 21, said method further comprising the step of:

generating said control signal in response to said analyzing step, wherein said amplifying step is performed in response to said control signal.

23. The method according to claim 21, wherein said amplifying step is manually controlled.

24. The method according to claim 21, wherein said analyzing step further includes the step of converting said synchronization components to ramp signals.

25. The method according to claim 24, wherein said analyzing step further includes the step of digitizing said ramp signals.

26. The method according to claim 25, wherein said analyzing step further includes the step of processing said digitized ramp signals.

27. The method according to claim 26, wherein said control signal identifies a maximum value of said ramp signals.

28. The method according to claim 27, wherein said analyzing step further includes the step of shifting a voltage of said composite video signals by a predetermined positive amount.

29. The method according to claim 28, wherein said analyzing step further includes the step of removing synchronization components of said composite video signals having a voltage at zero volts to remove a portion of said synchronization components having a voltage below zero volts.

30. The method according to claim 27, wherein said analyzing step further includes the step of filtering said maximum value of said ramp signals.

31. The method according to claim 24, wherein said analyzing step further includes the step of conditioning said ramp signals.

32. The method according to claim 24, wherein said converting step further includes the step of providing a voltage signal of known amplitude.

33. A keyboard, video and mouse ("KVM") system for selectively connecting a plurality of remote workstations each including a video monitor and an input device to a plurality of servers having video signal outputs comprising:

a switch to connect selected ones of the plurality of remote workstations to selected ones of the plurality of servers, wherein the switch routes input device signals to and from the selected ones of the plurality of remote workstations and to and from the selected ones of the plurality of servers, and routes video signals from the selected ones of the plurality of servers to the video monitors of the selected ones of the remote workstations, and wherein the switch contains a circuit for separating video signals received from the remote servers from data signals received from the remote servers; and a plurality of video signal conditioning circuits each comprising a video signal analysis circuit and a video amplification circuit, wherein selected ones of the plurality of video signal conditioning circuits operate on the video signals from the selected ones of the plurality of servers, wherein the video signal analysis circuit of each of the selected ones of the video signal conditioning provides a high frequency correction signal and a low frequency correction signal according to an analysis of the video signals, and wherein the video amplification circuit of each of the selected ones of the video signal conditioning circuits receives the high frequency correction signal from the video signal analysis circuit of the selected video signal conditioning circuit.

34. The system according to claim 33, wherein said high frequency correction signal identifies an amount of amplification to be applied by said video amplification circuit.

35. The system according to claim 33, wherein said video signal analysis circuit compares amplitudes of a first group of high frequency components of the video signals having a magnitude greater than a first predetermined magnitude to amplitudes of a second group of low frequency components of the video signals having a magnitude less than a second predetermined magnitude.

36. The system according to claim 33, wherein said video amplification circuit amplifies said high frequency components having a magnitude greater than a first predetermined magnitude.

37. The system according to claim 33, further comprising a tuning circuit for adjusting said video amplification circuit.

38. The system according to claim 37, wherein said tuning circuit is manually controlled.

39. A keyboard, video and mouse ("KVM") system for selectively connecting a plurality of remote workstations each including a video monitor and a input device to a plurality of servers each having video signal outputs, the KVM system comprising:
- a switch to connect selected ones of the plurality of remote workstations to selected ones of the plurality of servers, wherein the switch routes input device signals to and from the selected ones of the plurality of remote workstations and to and from the selected ones of the plurality of servers, and routes video signals from the selected ones of the plurality of servers to the video monitors of selected ones of the remote workstations;
- a circuit in an interface module for separating the video signals from the input device signals, wherein the video signals and the input device signals are transmitted to the interface module on a single communications link;
- a plurality of video signal conditioning circuits located in the interface module each comprising a synchronization signal analyzing circuit and a video amplification circuit, wherein selected ones of the plurality of video signal conditioning circuits operate on the video signals from the selected ones of the plurality of servers;
- an extraction circuit for extracting video components and synchronization signals from the video signals transmitted from one of the selected ones of the plurality of servers; and
- a synchronization signal analyzing circuit for analyzing said synchronization signals to determine an attenuation of high frequency components of said synchronization signals and to provide a high frequency correction signal according to an analysis of the extracted synchronization signals,
- wherein the video amplification circuit of each of the selected ones of the video signal conditioning circuits receives the high frequency correction signal from the synchronization signal analyzing circuit of the selected video signal conditioning circuit.

40. The system according to claim 39, further comprising a tuning circuit for adjusting said video amplification circuit.

41. The system according to claim 40, wherein said tuning circuit is manually controlled.

42. The system according to claim 39, wherein said synchronization signal analyzing circuit includes circuitry for converting said synchronization signals to ramp signals.

43. The system according to claim 42, wherein said synchronization signal analyzing circuit includes an analog to digital converter for digitizing said ramp signals.

44. The system according to claim 43, wherein said synchronization signal analyzing circuit includes a processor for analyzing said digitized ramp signals.

45. The system according to claim 44, wherein said high frequency correction signal is indicative of a maximum value for said ramp signals.

46. The system according to claim 45, wherein said video signal conditioning circuit includes circuitry for shifting a voltage of said video signals by a predetermined positive amount.

47. The system according to claim 46, wherein said synchronization signal analyzing circuit includes circuitry for removing a portion of said synchronization signals having a voltage below zero volts.

48. The system according to claim 47, wherein said circuitry for removing said portion of said synchronization signals provides said circuitry for converting said synchronization signals with synchronization signals of known amplitude.

49. The system according to claim 45, wherein said synchronization signal analyzing circuit includes circuitry for filtering said maximum value of said ramp signals.

50. The system according to claim 42, wherein said synchronization signal analyzing circuit includes circuitry for conditioning said ramp signals.

* * * * *